US009317197B2

(12) United States Patent
Takuma et al.

(10) Patent No.: US 9,317,197 B2
(45) Date of Patent: Apr. 19, 2016

(54) STORAGE MEDIUM STORING INFORMATION PROCESSING PROGRAM TO BE EXECUTED BY COMPUTER OF INFORMATION PROCESSOR TO PERFORM A PROCESS ACCORDING TO AN INPUT TO TOUCH SURFACES

(71) Applicant: NINTENDO CO., LTD., Kyoto (JP)

(72) Inventors: Hiroki Takuma, Kyoto (JP); Kiyofumi Funahashi, Kyoto (JP); Yasumasa Miyoshi, Kyoto (JP); Yuki Takahashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 342 days.

(21) Appl. No.: 13/690,668

(22) Filed: Nov. 30, 2012

(65) Prior Publication Data

US 2013/0141373 A1    Jun. 6, 2013

(30) Foreign Application Priority Data

Dec. 2, 2011 (JP) ................................. 2011-265343

(51) Int. Cl.
*G06F 3/041* (2006.01)
*G06F 3/0488* (2013.01)

(52) U.S. Cl.
CPC .......... *G06F 3/0488* (2013.01); *G06F 3/04883* (2013.01)

(58) Field of Classification Search
None
See application file for complete search history.

(56) References Cited

U.S. PATENT DOCUMENTS

| 2009/0150775 | A1   | 6/2009  | Miyazaki et al. |
| 2010/0188344 | A1   | 7/2010  | Shirakawa et al. |
| 2010/0188353 | A1 * | 7/2010  | Yoon et al. ................. 345/173 |
| 2010/0259494 | A1 * | 10/2010 | Kii ............................. 345/173 |
| 2011/0018821 | A1   | 1/2011  | Kii |
| 2011/0080359 | A1 * | 4/2011  | Jang ..................... G06F 1/1643 345/173 |
| 2012/0174044 | A1 * | 7/2012  | Koga et al. ..................... 715/863 |

FOREIGN PATENT DOCUMENTS

| DE | EP 2282256 A1 * | 2/2011 | ............ G06F 3/0414 |
| JP | 2003-33061      | 1/2003 | |

(Continued)

OTHER PUBLICATIONS

Shen et al., Double-side Multi-touch Input for Mobille Devices, Apr. 4, 2009, Boston, MA, USA, pp. 1-6, www.interaction-design.org/literature/conference/proceedings-of-acm-chi-2009-conference-on-human-factors-in-computing-systems.*

*Primary Examiner* — Ilana Spar
*Assistant Examiner* — Kirk Hermann
(74) *Attorney, Agent, or Firm* — Nixon & Vanderhye, P.C.

(57) ABSTRACT

An information processing program stored in a storage medium allows the computer (21) to function as a first processing unit, a second processing unit, and a mode selection unit. The first processing unit executes a first process based on the first touch operation (S16, S22). The second processing unit executes a second process based on the first touch operation and the second touch operation (S30). The first and second touch operations are detected by the information processor based on a first touch operation on a first touch surface and a second touch operation on a second touch surface. The mode selection unit selects a first mode in which the first process is executed based on the first touch operation, or a second mode in which the second process is executed based on the first touch operation and the second touch operation (S15).

9 Claims, 17 Drawing Sheets

(56) References Cited

FOREIGN PATENT DOCUMENTS

| | | |
|---|---|---|
| JP | 2009-157908 | 7/2009 |
| JP | 2010-108061 | 5/2010 |
| JP | 2010-170479 | 8/2010 |
| JP | 2010-250465 | 11/2010 |
| JP | 2012-141868 | 7/2012 |

\* cited by examiner

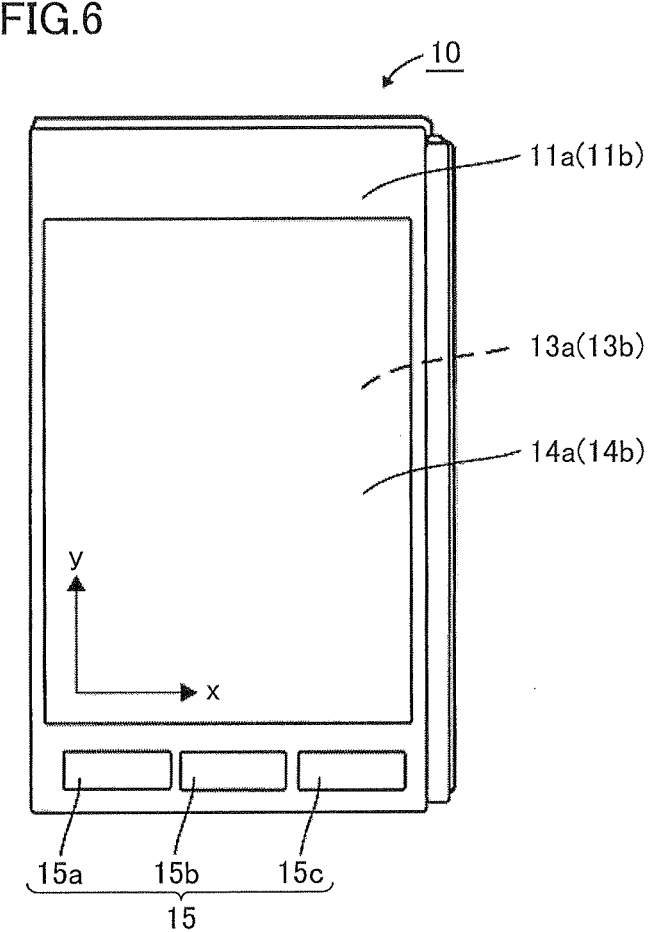

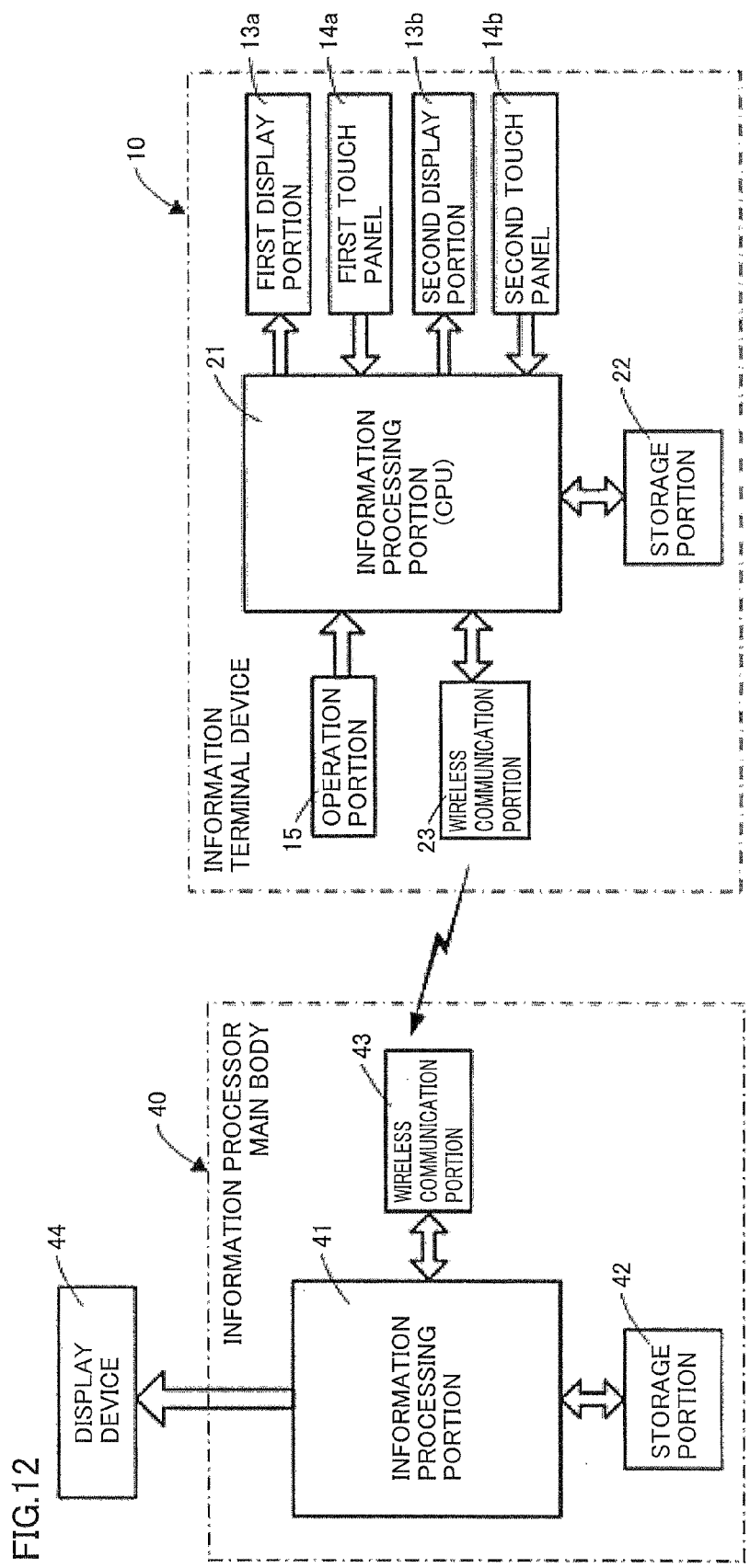

STORAGE MEDIUM STORING INFORMATION PROCESSING PROGRAM TO BE EXECUTED BY COMPUTER OF INFORMATION PROCESSOR TO PERFORM A PROCESS ACCORDING TO AN INPUT TO TOUCH SURFACES

This application claims priority to JP 2011-265343 filed 2 Dec. 2011, the entire contents of each of which are hereby incorporated by reference.

FIELD

The technology herein relates to storage media storing an information processing program, and more particularly to storage media storing an information processing program that performs a process according to an input to, e.g., a pointing device such as a plurality of touch panels or touch pads.

BACKGROUND AND SUMMARY

This application describes a storage medium storing an information storage program to be executed by a computer of an information processor.

Information processors with a touch panel, a touch pad, etc. have been widely used. Such information processors have a computer, and for example, a mobile phone, a mobile game machine, a personal digital assistant (PDA), etc. are known as the information processors. These information processors have a storage medium storing an information processing program to be executed by the computer of the information processor.

This application can provide a storage medium storing an information processing program to be executed by a computer of an information processor, which allows the user to perform various input operations as intuitive input operations using a pointing device such as a touch panel or a touch pad.

A first aspect is directed to a recording medium storing an information processing program to be executed by a computer (21) of an information processor (10). The information processor of the first aspect has a first touch surface (14a), a second touch surface (14b in FIG. 6) placed on a back side of the first touch surface, a first touch operation detection portion (21) that detects a first touch operation on the first touch surface, and a second touch operation detection portion (21) that detects a second touch operation on the second touch surface. The computer (21) is connected to the first touch operation detection portion (21) and the second touch operation detection portion (21). The information processing program allows the computer to function as a first processing unit that executes a first process based on the first touch operation detected by the first touch operation detection portion, a second processing unit that, if the first touch operation detected by the first touch operation detection portion and the second touch operation detected by the second touch operation detection portion are slide operations in opposite directions to each other, executes a second process different from the first process based on the first touch operation detected by the first touch operation detection portion and the second touch operation detection portion, and a mode selection unit that selects a first mode in which the first processing unit executes the first process based on the first touch operation, or a second mode in which the second processing unit executes the second process based on the first touch operation and the second touch operation (a third specific process and a fourth specific process; S30; NO in S36; S38 to S41).

In "BACKGROUND AND SUMMARY," description in parentheses refers to the reference characters of corresponding elements in example embodiments etc.

The mode selection unit may select the first mode or the second mode based on a detection result of the second touch operation detection portion.

When the first touch operation has been detected by the first touch operation detection portion, the mode selection unit may select the first mode or the second mode based on the detection result of the second touch operation detection portion.

When the first touch operation has been detected by the first touch operation detection portion, and the second touch operation has been detected by the second touch operation detection portion, the mode selection unit may select the second mode if at least one of the first touch operation and the second touch operation is a predetermined operation.

The first touch surface and the second touch surface may be placed so as to at least partially overlap each other as viewed in a direction perpendicular to the first touch surface and the second touch surface.

The first touch surface and the second touch surface may be placed so that the first touch surface and the second touch surface can be substantially simultaneously touched with one hand.

The information processing program may further allow the computer to function as a difference calculation unit (S64) that calculates a first distance at a first time between a first touch position corresponding to the first touch operation detected by the first touch operation detection portion and a second touch position corresponding to the second touch operation detected by the second touch operation detection portion, and a second distance between the first touch position and the second touch position at a second time later than the first time, and calculates a difference between the first distance and the second distance. The second processing unit may execute the second process if the difference calculated by the difference calculation unit satisfies a predetermined condition.

The second processing unit may execute the second process if an absolute value of the difference calculated by the difference calculation unit exceeds a predetermined value (YES in S65; S73).

A second aspect is directed to a storage medium storing an information processing program to be executed by a computer of an information processor. The information processor of the second aspect has a first touch surface (14a), a second touch surface (14b), a first touch operation detection portion (21) that detects a first touch operation on the first touch surface, and a second touch operation detection portion (21) that detects a second touch operation on the second touch surface, and the computer is connected to the first touch operation detection portion and the second touch operation detection portion. The information processing program allows the computer to function as a first processing unit that executes a predetermined process on a display object displayed on a display portion, based on the first touch operation detected by the first touch operation detection portion, and a second processing unit that executes a process of switching the display object displayed on the display portion, based on the first touch operation detected by the first touch operation detection portion and the second touch operation detected by the second touch operation detection portion (S30; NO in S33; S42 to S43).

A third aspect is directed to a storage medium storing an information processing program to be executed by a computer of an information processor. The computer of the information processor of the third aspect is connected to a first touch operation detection portion (21) that detects a first touch operation on a first touch surface (14a), and a second touch operation detection portion (21) that detects a second touch operation on a second touch surface (14b), and the information processing program allows the computer (21) to function as a first processing unit that executes a first process based on the first touch operation detected by the first touch operation detection portion, and a second processing unit that executes a process of limiting an operation on the information processor or cancelling the limitation, based on the first touch operation detected by the first touch operation detection portion and the second touch operation detected by the second touch operation detection portion (third and fourth specific processes; S30; NO in S36; S38 to S41).

A fourth aspect is directed to a storage medium storing an information processing program to be executed by a computer of an information processor. The information processor of the fourth aspect has a first touch surface (14a), a second touch surface (FIG. 6, 14b) placed on a back side of the first touch surface, a first touch operation detection portion (21) that detects a first touch operation on the first touch surface, and a second touch operation detection portion (21) that detects a second touch operation on the second touch surface. The computer is connected to the first touch operation detection portion and the second touch operation detection portion, and the information processing program allows the computer to function as a processing unit that, when one of the first touch operation and the second touch operation is a slide operation and the other is an operation of substantially not changing a touch position, executes a predetermined process if the first touch operation and the second touch operation are performed within a specific region as viewed in a direction perpendicular to the first touch surface and the second touch surface (example embodiment of FIG. 7F; S64 to S66; S73).

A fifth aspect is directed to a storage medium storing an information processing program to be executed by a computer of an information processor. The information processor of the fifth aspect has a first touch operation detection portion (21) that detects a first touch operation on a first touch surface (14a, 34a), and a second touch operation detection portion (21) that detects a second touch operation on a second touch surface (14b, 34b). The computer (21) is connected to the first touch operation detection portion and the second touch operation detection portion. The information processing program allows the computer (21) to function as a mode switch unit that switches a display mode between a first display mode and a second display mode, a first processing unit that executes a first process based on the first touch operation detected by the first touch operation detection portion, when the display mode is the first display mode, and a second processing unit that executes a second process different from the first process based on the first touch operation detected by the first touch operation detection portion, and executes the first process based on at least the second touch operation detected by the second touch operation detection portion, when the display mode is the second display mode (sixth example embodiment; S121 to S153).

The second processing unit may executes the first process based on the second touch operation, instead of the first process that is executed by the first processing unit based on the first touch operation.

The second processing unit may execute the first process based on the first touch operation detected by the first touch operation detection portion and the second touch operation detected by the second touch operation detection portion.

The information program may further allow the computer to function as a first display control unit that displays a predetermined display object on a display portion, when the display mode is the first display mode, and a second display control unit that displays the predetermined display object in an enlarged size on the display portion, when the display mode is the second display mode, the first processing unit may switch the display object as the first process, and the second processing unit may switch the display object as the first process, and scrolls a screen of the display portion as the second process.

According to this aspect, the first process that is executed based on the first touch operation in the first display mode changes to the second process different from the first process of the second display mode. In the second display mode, the first process is executed based on the second touch operation. Thus, the first process can be executed by a simple operation even if the display mode is switched and the process based on the first touch operation changes to the second process.

For example, an operation to go to the next page or return to the previous page, which is performed on the first touch surface in a normal display mode, changes to an operation to scroll the screen in an enlarged display mode. However, the command to go to the next page or return to the previous page can be entered by performing an operation on the second touch panel. Thus, even if the operation to go to the next page or return to the previous page based on the first touch operation changes to the operation to scroll the screen in the enlarged display mode, the command to go to the next page or return to the previous page can be entered by a simple operation.

BRIEF DESCRIPTION OF THE DRAWINGS

FIG. 6 shows an appearance of the information processor of the non-limiting example embodiment.

FIG. 12 is a block diagram of an information processing system of a further non-limiting example embodiment.

DETAILED DESCRIPTION OF NON-LIMITING EXAMPLE EMBODIMENTS

First Example Embodiment

Figure 1:
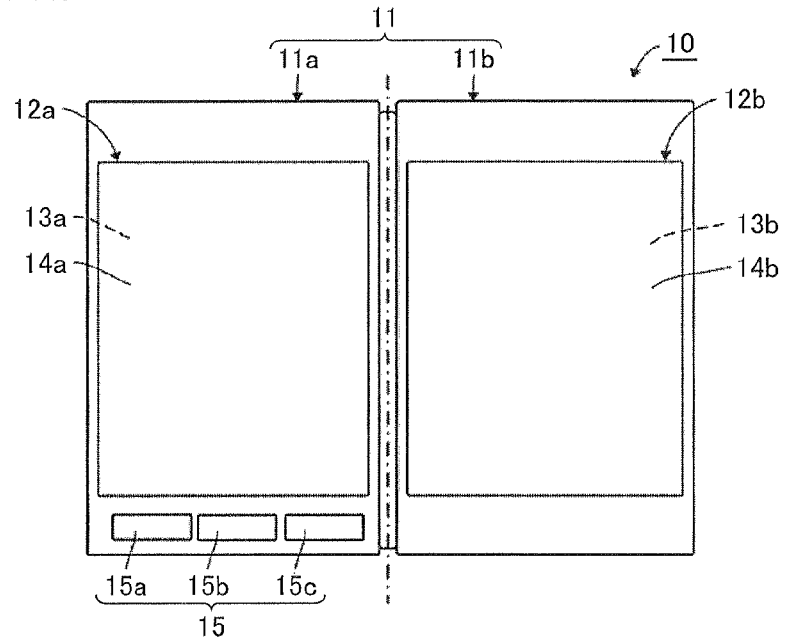
FIG. 1 shows an appearance of an information processor of a non-limiting example embodiment.

A first example embodiment will be described with reference to FIG. 1. In the first example embodiment, an information processor 10 is an example of a portable information terminal device, and includes a housing main body 11. The housing main body 11 is configured so as to be foldable between housings 11a, 11b. The folding structure of the housings 11a, 11b is configured so that the housing main body 11 can be folded inward or outward by pivotally supporting the housing main body 11 by an axis (dashed line in FIG. 1) positioned close to one longer side of the housing 11a or 11b.

The inward foldable structure is a structure that is rotatable in the range of 180 degrees from the closed state, and that folds the housing main body 11 so that first and second display portions 13a, 13b described below face each other. The outward foldable structure is a structure that is rotatable in the range of 360 degrees from the closed state, and that folds the housing main body 11 so that the display portions 13a, 13b are located on the front side and the back side (or the front surface and the back surface), respectively, when the outward foldable structure is rotated by 360 degrees. Another possible folding structure is a structure that allows the back surfaces of the housings 11a, 11b (the surfaces having no display portions 13a, 13b mounted thereon) to face each other in the closed state, and that allows the display portions 13a, 13b to be seen in a double-spread state when rotated by about 180 degrees to the open state.

The housing 11a has a large opening 12a in its one principal surface (a surface shown in the figure), and accommodates the first display portion 13a so that the first display portion 13a is visible from the outside via the opening 12a. A first touch panel (a first touch surface) 14a as an example of a pointing device (a coordinate input portion) is bonded (or mounted) to the upper surface of the first display portion 13a. Similarly, the housing 11b has a large opening 12b in its one principal surface (a surface shown in the figure), and accommodates the second display portion 13b so that the second display portion 13b is visible from the outside via the opening 12b. A second touch panel (a second touch surface) 14b is bonded (or mounted) to the upper surface of the second display portion 13b. The display portion 13a and the touch panel 14a form a first touch screen, and the display portion 13b and the touch panel 14b form a second touch screen. In the first example embodiment, the touch panels 14a, 14b are thus placed close to each other in the lateral direction so that the touch panels 14a, 14b can be seen in a double-spread state. In this case, the touch panels 14a, 14b can be substantially simultaneously operated with the index finger and the middle finger, namely with one hand.

For example, liquid crystal display portions etc. are used as the display portions 13a, 13b. The touch panels 14a, 14b are transparent touch panels (or touch pads), and may be of any type such as a capacitance type, a resistance film type, an electromagnetic induction type, a matrix type, an infrared type, a surface acoustic wave type, etc.

In the first example embodiment, in order to facilitate detection of coordinates and detection of a touch operation based on the detected coordinates, the touch panels 14a, 14b have substantially the same planar shape, and are placed so as to completely overlap each other, and the same setting of a coordinate system is selected for the touch panels 14a, 14b. In this case, the coordinate system of each touch panel 14a, 14b has its origin at, e.g., the lower left corner of the touch panel 14a, 14b.

As a modification, the touch panels 14a, 14b may have different sizes, and the respective coordinate systems of the touch panels 14a, 14b may be set so as to partially overlap each other.

A plurality of operation switches (or operation keys) 15a, 15b, 15c as an example of an operation portion 15 are mounted below the opening 12a of the housing 11a. These operation switches 15a to 15c are used to input functions other than those of icons displayed on the touch panels 14a, 14b. For example, these operation switches 15a to 15c include a power switch that turns on or off the power by press and hold, a key that is used to move a cursor, etc. A fold detection portion (25 in FIG. 2) is contained in one of the housings 11a, 11b.

Figure 2:
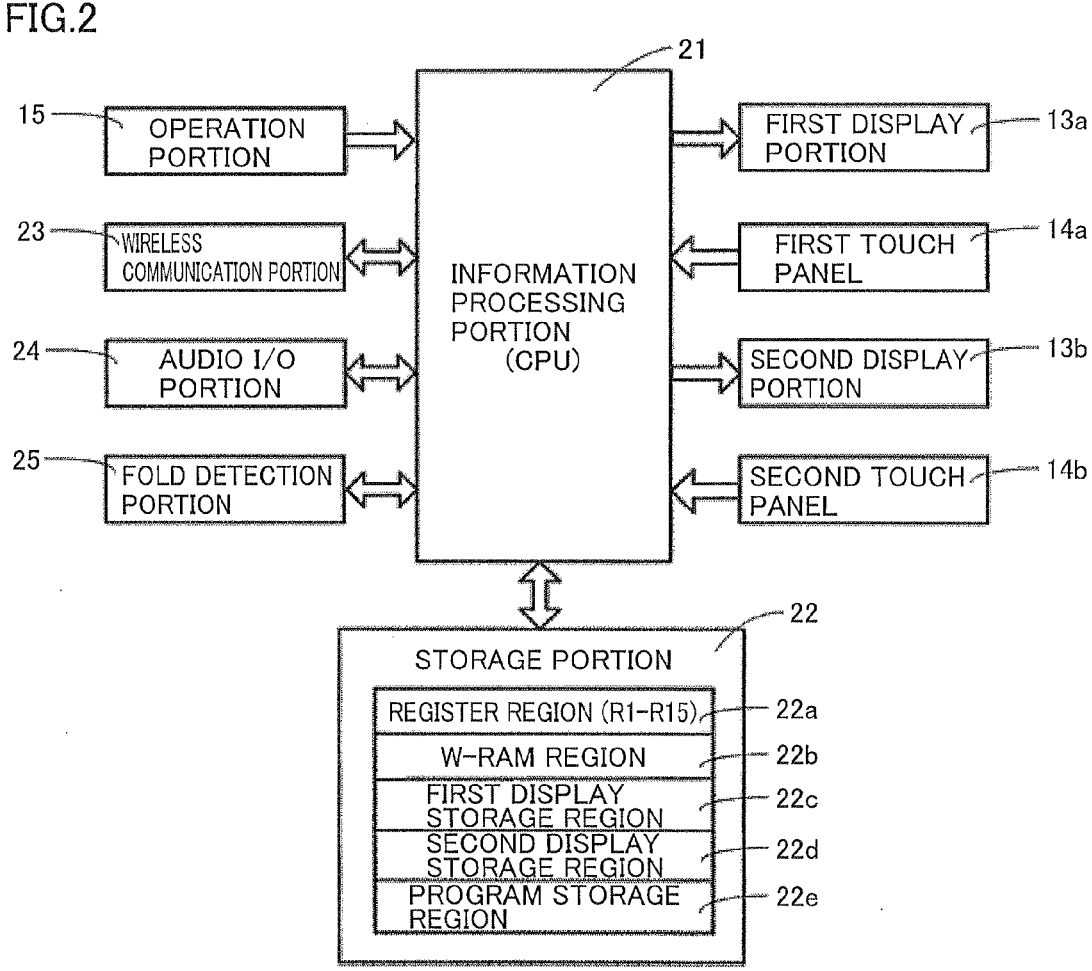
FIG. 2 is a block diagram of the information processor of the non-limiting example embodiment.

In FIG. 2, the information processor 10 includes an information processing portion (a computer) 21 such as a central processing unit (CPU), and is accommodated in one of the housings 11a, 11b. The first display portion 13a, the second display portion 13b, the first touch panel 14a, and the second touch panel 14b are connected to the information processing portion 21. A storage portion 22 is connected to the information processing portion 21 via a data bus and an address bus.

For example, a readable/writable storage medium such as a random access memory (RAM), a flash memory, or a hard disk is used as the storage portion 22, and the storage portion 22 includes a plurality of storage regions 22a to 22e. Specifically, the storage region 22a is a register region including a plurality of registers (e.g., R1 to R13), and is used to store X-coordinate data (Xa1 to Xa3, Xb1 to Xb3) and Y-coordinate data (Ya1 to Ya3, Yb1 to Yb3) of the current touch position (R1 to R4), the touch-on position (R5 to R8), and the touch-off position (R9 to R12) when touching the surface of the touch panel 14a and/or the touch panel 14b with a finger, a stylus pen, etc. A part of the register region is used as a flag (R13). Registers R14, R15 are added as necessary, and are used in a sixth example embodiment (FIG. 14) described below.

The storage region 22b is a working RAM region, and is used to temporarily store data when performing various processes. The storage region 22c is used as a first display data storage region that stores image data to be displayed on the first display portion 13a. The storage region 22d is used as a second display data storage region that stores image data to be displayed on the second display portion 13b. The storage region 22e is used as a program storage region that stores various programs. The storage region 22e may be formed either by a read only memory such as a ROM, or by a RAM, a hard disk, etc. having installed therein a program stored in an optical recording medium such as a compact disc read only memory (CD-ROM) or a digital versatile disc (DVD).

The operation portion 15, a wireless communication portion 23, and an audio input/output (I/O) portion 24 are also connected to the information processing portion 21. The wireless communication portion 23 is used to transmit and receive data to and from another information processor (e.g., a mobile information processor such as that of this example embodiment, a stationary video game machine, a personal computer, etc.). The audio I/O portion 24 is used to enter an audio input to the information processing portion 21, or to provide audio output of the processing result of the information processing portion 21. The fold detection portion 25 is also connected to the information processing portion 31. The fold detection portion 25 is used to detect that the display portions 13a, 13b and the touch panels 14a, 14b of the information processor 10 are being used in the outward folded state rather than in the double-spread state (as described below with reference to FIG. 6, the case where 13a, 14b are used as the front surface, and 13b, 14b are used as the back surface).

In addition to a mode for normal use, the information processor 10 of the first example embodiment has a special mode in the case where the display portions 13a, 13b are arranged in the lateral direction in the double-spread state. An operation that is rarely performed for the normal intended use is used to select the special mode. In the first example embodiment, the "first mode" refers to the case where a normal (or common) process is executed by operating only one of the touch panels 14a, 14b, and the "second mode" refers to the case where a special process is executed by substantially simultaneously operating both touch panels 14a, 14b.

First, the first mode (a normal mode) will be generally described. When the information processor 10 executes the normal mode as a process (a first process) that is frequently performed according to the original intended use of an application, the user performs an operation such as a tap operation, a flick operation, or a drag operation on one of the touch panels 14a, 14b. As used herein, the "tap operation" refers to an operation in which, with, e.g., one or more icons (a predetermined function has been defined for each icon) being displayed on the display portion 13a and/or 13b, the user selects an icon by touching the corresponding touch panel 14a or 14b and performing a touch-off without substantially changing the touch position. The "flick operation" is an operation in which, with, e.g., a part of the contents such as an image or text being displayed on the display portion 13a and/or 13b, the user scrolls the screen by touching the touch panel 14a or 14b and performing a touch-off after changing the touch position within a predetermined time while maintaining the touch. The "slide operation" is an operation in which, with, e.g., characters being displayed on the display portion 13a and/or 13b, the user moves a character by touching the character and changing the touch position while maintaining the touch, or an operation in which, with, e.g., a part of the contents being displayed on the display portion 13a and/or 13b, the user scrolls the screen by touching the touch panel 14a or 14b and changing the touch position while maintaining the touch.

In the first example embodiment, an operation method that is rarely used in the first mode is used to select the second mode. The second mode is selected by simultaneously performing an input operation on both touch panels 14a, 14b (step S15 in FIG. 4 described below). That is, the second mode is selected by operating the other touch panel 14a, 14b while operating one of the touch panels 14a, 14b. In the second mode, a predefined specific process (step S30 in FIG. 4, specifically, step S35, S37, S39, S41, S43 in FIG. 5) is performed as a second process, according to the kind of gesture corresponding to the input to the touch panels 14a, 14b.

Operation (or gesture) examples and their definitions in the "second mode" of the first example embodiment will be generally described with reference to FIGS. 3A to 3D. Four kinds of gesture input can be performed in the second mode. Namely, operations of starting an application as shown in FIG. 3A, ending an application as shown in FIG. 3B, locking the device as shown in FIG. 3C, and unlocking the device as shown in FIG. 3D can be performed in the second mode.

Figure 3A:
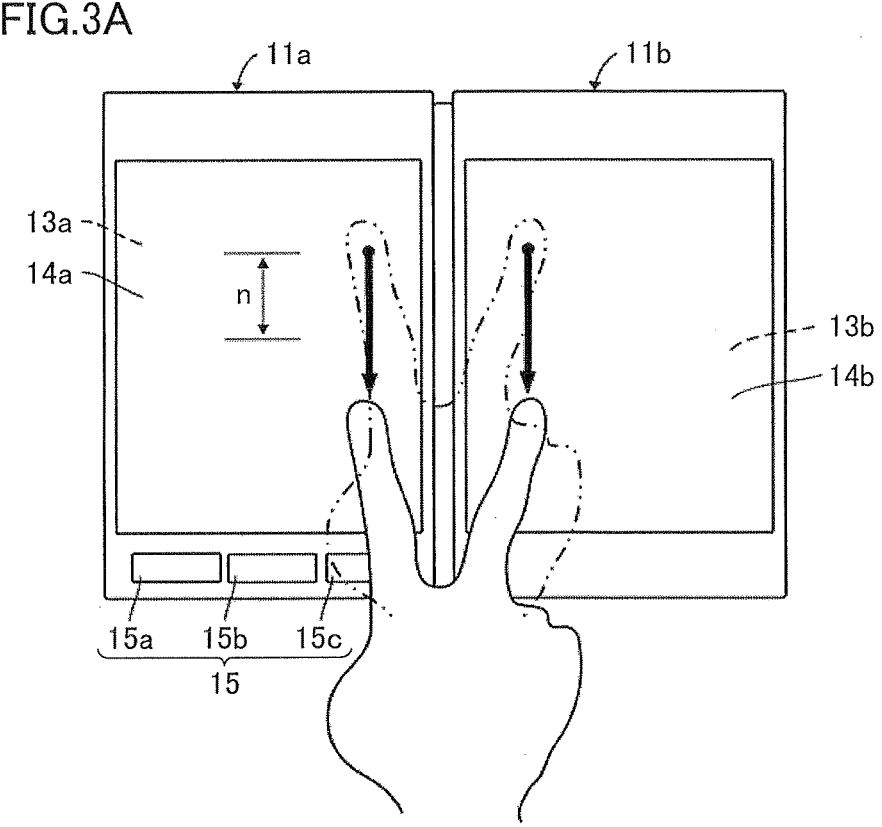
FIGS. 3A to 3D show operation (gesture) examples of the non-limiting example embodiment.

Specifically, in the gesture shown in FIG. 3A, the user makes a V-shape with two fingers (e.g., index and middle fingers) of one hand (makes a V-sign), places one of the fingers (index finger) on the touch panel 14a and the other finger (middle finger) on the touch panel 14b, and slides the fingers downward along the touch panels 14a, 14b (or gently rubs the surface of the touch panels 14a, 14b in the downward direction) by an amount larger than a threshold value (n). The two fingers are simultaneously moved in this operation example. This operation is defined as a command to "start an application." For example, in the case where one or more icons corresponding to applications are displayed on the display portion 13a, the application corresponding to the selected icon is started by selecting the icon and then performing this operation.

Figure 3B:
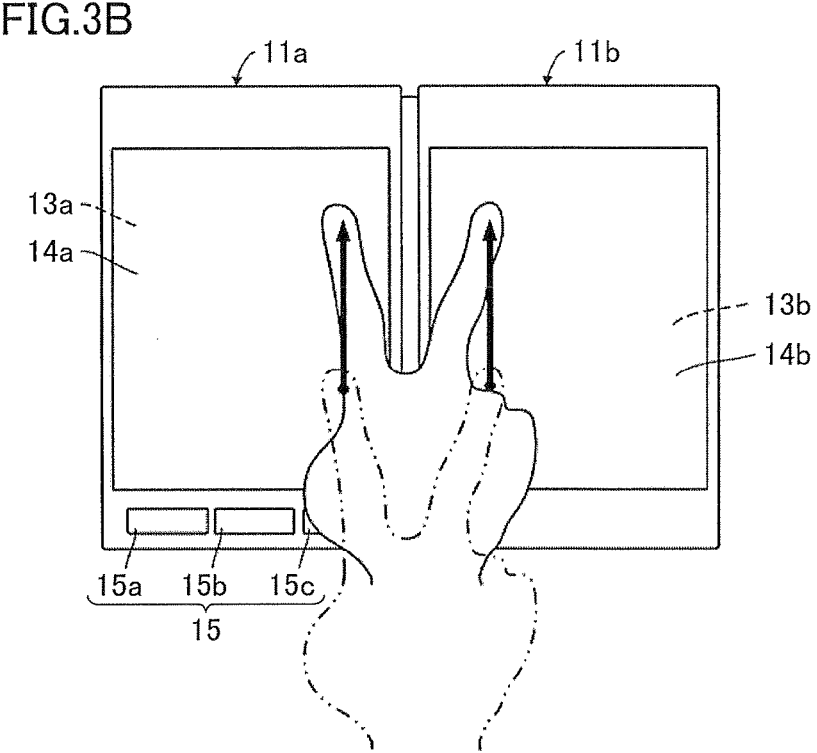

The gesture shown in FIG. 3B is similar to that of FIG. 3A in the shape and movement of the fingers, but is different therefrom in the direction of the movement of the fingers. In the gesture of FIG. 3B, the user slides the fingers upward (in the opposite direction from that of FIG. 3A) along the touch panels 14a, 14b by an amount larger than the threshold value (n). This operation is defined as a command to "end an application." For example, in the case where an application has been started and the contents of the application are displayed on the display portions 13a, 13b, this application is started by performing this operation.

Figure 3C:
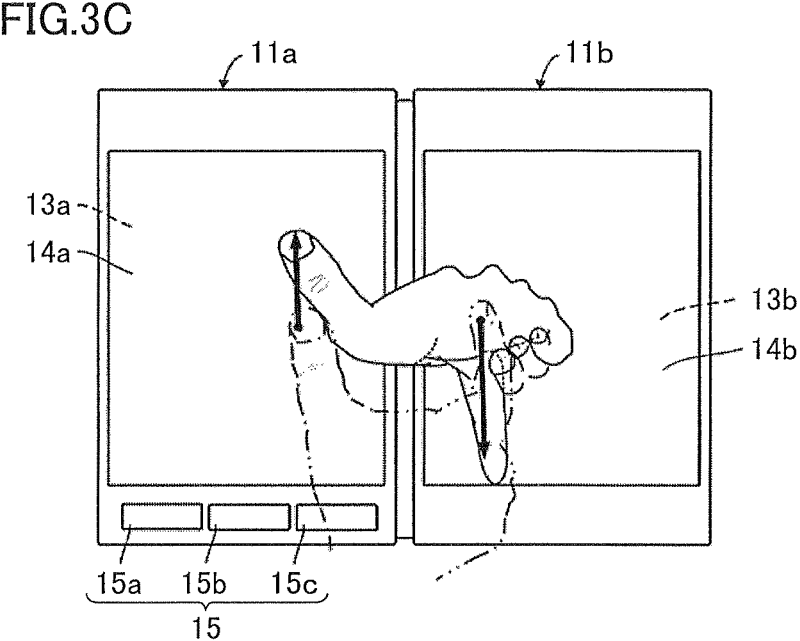
Figure 3D:
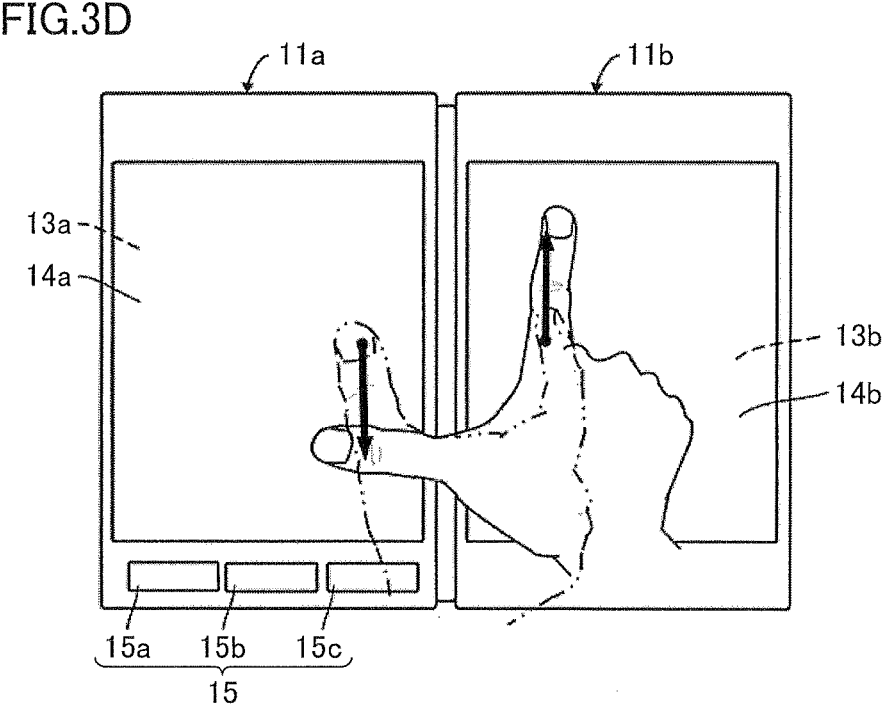

In the gesture shown in FIG. 3C, the user makes a V-shape with two fingers, and slides one of the fingers (thumb) upward and the other finger (index finger) downward so that at least one of the fingers is moved by an amount larger than the threshold value (n). That is, in this operation example, the touch positions of one of the fingers (thumb) and the other finger (index finger) are moved in the opposite directions. The operation as shown in FIG. 3C is defined as a command to "lock the device" as an example of limiting the operation of the information processor 10. For example, if this operation is performed when the information processor 10 is able to accept operations to applications, the information processor 10 is disabled to accept operations to applications (the information processor 10 does not accept any operations other than the operation of unlocking the device described below).

In the gesture shown in FIG. 3D, the user makes a V-shape with two fingers, and slides one of the fingers (thumb) downward and the other finger (index finger) upward so that at least one of the fingers is moved by an amount larger than the threshold value (n). In this operation example, each of the two fingers is moved in the opposite direction from that of the operation example of FIG. 3C. The operation shown in FIG. 3C is defined as a command to "unlock the device" as an example of canceling the limitation of the operation of the information processor 10. For example, if this operation is performed when the information processor 10 is not able to accept operations to applications, the information processor 10 is enabled to accept operations to applications.

The operation examples and their definitions shown in FIGS. 3A to 3D are merely by way of example, and other gestures may be used. The gestures may be otherwise defined as appropriate according to required input commands.

For example, the user may make a narrow-angle V-shape with two fingers (index and middle fingers), and after performing a touch-on as shown in FIG. 3A, may move the two fingers outward (away from each other) by an amount larger than the threshold value. Alternatively, the user may make a wide-angle V-shape with two fingers (index and middle fingers), and after performing a touch-on, may move the two fingers inward (toward each other) by an amount larger than the threshold value. In this case, the former gesture may be defined as a command to "switch the application," and the latter gesture may be defined as a command to "switch the page within the application."

The operation examples of the gestures shown in FIGS. 3A to 3D may be defined in a manner similar to that described above, even if the two fingers are placed on the touch panels 14a, 14b, and only one of the fingers is moved by more than a predetermined amount (the threshold value) and the other finger is moved by an amount equal to or less than the threshold value. In other words, it may be determined that there has been such a gesture, even if the touch panels 14a, 14b are touched substantially simultaneously, and only one of the fingers is moved by an amount larger than the threshold value.

The operation examples and the operation of the first example embodiment will be described with reference to FIGS. 1 to 3D and according to the flowcharts of FIGS. 4 and 5.

(Processing in First Mode)

First, the "first mode" will be described in which a normal process is performed according to a predetermined gesture by operating only the first touch panel 14a. In response to turning-on of the power switch, the information processor 21 starts the following processing based on various programs stored in the program storage region 22e. That is, in step S1, the storage regions 22a to 22d are initialized (cleared). In step S2, a process of displaying the initial screen is performed. This process is a process of, e.g., writing display data such as an image or text of a menu, icons, etc. to be displayed on the initial screen to the storage regions 22c, 22d, although the process varies depending on the application program stored in the program storage region 22e. The display data written in the storage regions 22c, 22d is displayed on the corresponding display portions 13a, 13b.

Then, it is determined in step S3 if there is any key input to the operation portion 15. If there is no key input, it is determined in step S4 if there is a finger touch on the touch panel 14a. If there is no finger touch on the touch panel 14a, it is determined in step S5 if a touch-off has occurred on the touch panel 14a. In this case, if a finger touch is lifted from the touch panel 14a in step S4 after touch-on coordinates are stored (the touch is maintained) in step S14 described below, it is determined that the touch-off has occurred. It is determined in step S6 if there is a finger touch on the touch panel 14b. If there is no finger touch on the touch panel 14b, it is determined in step S7 if a touch-off has occurred on the touch panel 14b. If there is no input, the program returns to step S3 via step S11, and waits for an input. That is, the program continues to wait for a key operation or a touch on the touch panel 14a, 14b, if there is neither key operation nor touch on the touch panel 14a, 14b and if it is not immediately after the touch-off has occurred on the touch panel 14a, 14b.

If there is an input, for example, if any of the operation keys 15a to 15c in the operation portion 15 is depressed, it is determined in step S3 that there is an input. A process of the function corresponding to the depressed operation key is performed in step S8. It is determined in step S9 if the housings 11a, 11b are in the folded state (that is, if the display portions 13a, 13b are in the double-spread state) or not, based on the output of the fold detection portion 25. If in the double-spread state, "1" is written to a flag storing the double-spread state (any one bit of the register R13) in step S10. If "1" has been written to the folded-state flag, "0" is written to the folded-state flag. It is determined in step S11 that the power switch is not off, and then the program returns to step S3 and waits for an input.

If there is a touch on the touch panel 14a while the program is waiting for an input in steps S3 to S7, it is determined in step S4 that there is a touch on the touch panel 14a. In step S12, coordinate data (Xa1, Ya1) of the current finger touch position on the touch panel 14a is stored in the registers R1, R2 (Xa1→R1, Ya1→R2). It is determined in step S13 if a touch-on to the touch panel 14a has been started. If all the registers temporarily storing the touch-on coordinates on the touch panel 14a (R5, R6) are zero (Xa2=Ya2=0), it is determined that the touch-on has been started. In response to detection of the touch-on, the current coordinate data (Xa1, Ya1) stored in the registers R1, R2 is written to the registers R5, R6 (Xa1→R5, Ya1→R6), and is stored as coordinate data (Xa2, Ya2) at the start of the touch-on.

Then, if it is determined in step S13 that the touch-on has not been started, the program proceeds to step S15. If it is determined in step S15 that there is no touch on the touch panel 14b, a process in the state where the touch is maintained (a predetermined process on a display object, such as, e.g., scrolling the screen or moving a cursor) is performed as a process of the first mode based on the operation of the single touch panel 14a. Then, the program returns to step S3 via steps S9 to S11, and waits for an input in steps S3 to S7.

As long as the user continues the operation of touching the touch panel 14a, steps S3, S4, S12 to S16, and S9 to S11 are repeated in a certain short cycle, so that the registers R1, R2 are updated with the coordinate data corresponding to the current touch position.

If the user lifts the finger touch from the touch panel 14a (the user lifts the finger touch from the touch panel 14a), a touch-off is detected in step S5. In step S17, the current coordinate data (Xa1, Ya1) stored in the registers R1, R2 is written to the registers R9, R10 (Xa1→R9, Ya1→R10), and is stored as touch-off coordinates (Xa3, Ya3). In step S18, a process for the touch-off (a process such as, e.g., stopping the cursor, selecting a menu, or confirming selection of an icon) is performed according to the operation of the single touch panel 14a. The touch-on registers and the touch-off registers (R5 to R8, R9 to R12) are cleared after a certain period of time. Then, it is determined in step S6 that there is no finger touch on the touch panel 14b, and the program returns to wait for an input in steps S7, S11, S3 to S6.

On the other hand, if the user has touched the touch panel 14b with a finger, a normal (first mode) process based on the operation (or input) of the touch panel 14b is performed. That is, when the program waits for an input in steps S3 to S7, it is determined in step S6 that there is a finger touch on the touch panel 14b, and the process of steps S19 to S22 is performed. The process of steps S19 to S22 is similar to that of steps S12 to S14 except that current coordinate data (Xb1, Yb1) on the touch panel 14b are written to the corresponding registers R3, R4 (Xb1→R3, Yb1→R4), and that in response to detection of the start of a touch-on, the current coordinate data (Xb1, Yb1) is written to the registers R7, R8 (Xb1→R7, Yb1→R8) and is stored as touch-on coordinates (Xb2, Yb2). Then, in step S22, a process of the first mode based on the operation of the single touch panel 14b (e.g., a process in response to a normal touch input) is performed in a manner similar to that of step S16.

If the user lifts the finger from the touch panel 14b to perform a touch-off (lifts the finger touch), it is determined in step S7 that a touch-off has occurred on the touch panel 14b, and a process for the touch-off from the touch panel 14b is performed in steps S23, S24. The process in steps S23, S24 is similar to that in steps S17, S18 for the touch-off from the touch panel 14a except that in response to detection of the touch-off from the touch panel 14b, the current coordinate data (Xb1, Yb1) is written to the corresponding registers R11, R12 (Xb1→R11, Yb1→R12) and is thus stored as touch-off coordinate data (Xb3, Yb3).

As described above, a normal process is performed as the first mode when only the touch panel 14 or 14b is operated.

(Processing of Second Mode)

In the second mode, the user substantially simultaneously touches the touch panels 14a, 14b with two fingers as shown in any of FIGS. 3A to 3D as a gesture substantially simultaneously using the touch panels 14a, 14b. Steps S25 to S27 and S30 are performed according to this operation. Step S30 is specifically implemented by a special mode based on the simultaneous operation of the touch panels 14a, 14b, as shown in the subroutine of FIG. 5.

This prevents an unintended operation from being performed in the normal mode due to an erroneous operation by the user.

For example, referring to FIG. 3A, the user performs the following operation in order to input a command to "start an application." The user first makes a V-shape with two fingers, namely the index finger and the middle finger, and touches the touch panel 14a with the tip of one of the fingers and the touch panel 14b with the tip of the other finger. From this state, the user moves both fingers downward by an amount larger than the threshold value (n). In other words, the user starts a touch-on at a position shown by two-dot chain line, and moves the fingers in a direction toward a position shown by solid line.

In this operation state, a process based on the input to the touch panel 14a is performed in steps S4, S12 to S14, whereby current coordinate data on the touch panel 14a is written to the registers R1, R2 (Xa1→R1, Ya1→R2), and current coordinate data at the start of the touch-on is written to the registers R5, R6 (Xa1→R5, Ya1→R6), and is stored as touch-on coordinates (Xa2, Ya2). If it is determined in step S15 that there is a finger touch on the touch panel 14b as well, it is determined that the operation mode is the second mode, and the process of the "second mode" is selected in order to perform steps S25 to S27, S30.

That is, in step S25, current coordinate data (Xb1, Yb1) on the touch panel 14b is stored in the registers R3, R4. It is determined in step S26 if a touch-on to the touch panel 14b has been started. The touch-on is detected when all the coordinate data stored in the registers R7, R8 is zero (Xb2=Yb2=0). If the touch-on is detected, the current coordinate data (Xb1, Yb1) on the touch panel 14b is written to the registers R7, R8 (Xb1→R7, Yb1→R8), and is stored as touch-on coordinates (Xb2, Yb2). In step S30, a process of the subroutine of the second mode based on the simultaneous operation of the touch panels 14a, 14b is performed in step S30.

Figure 5:
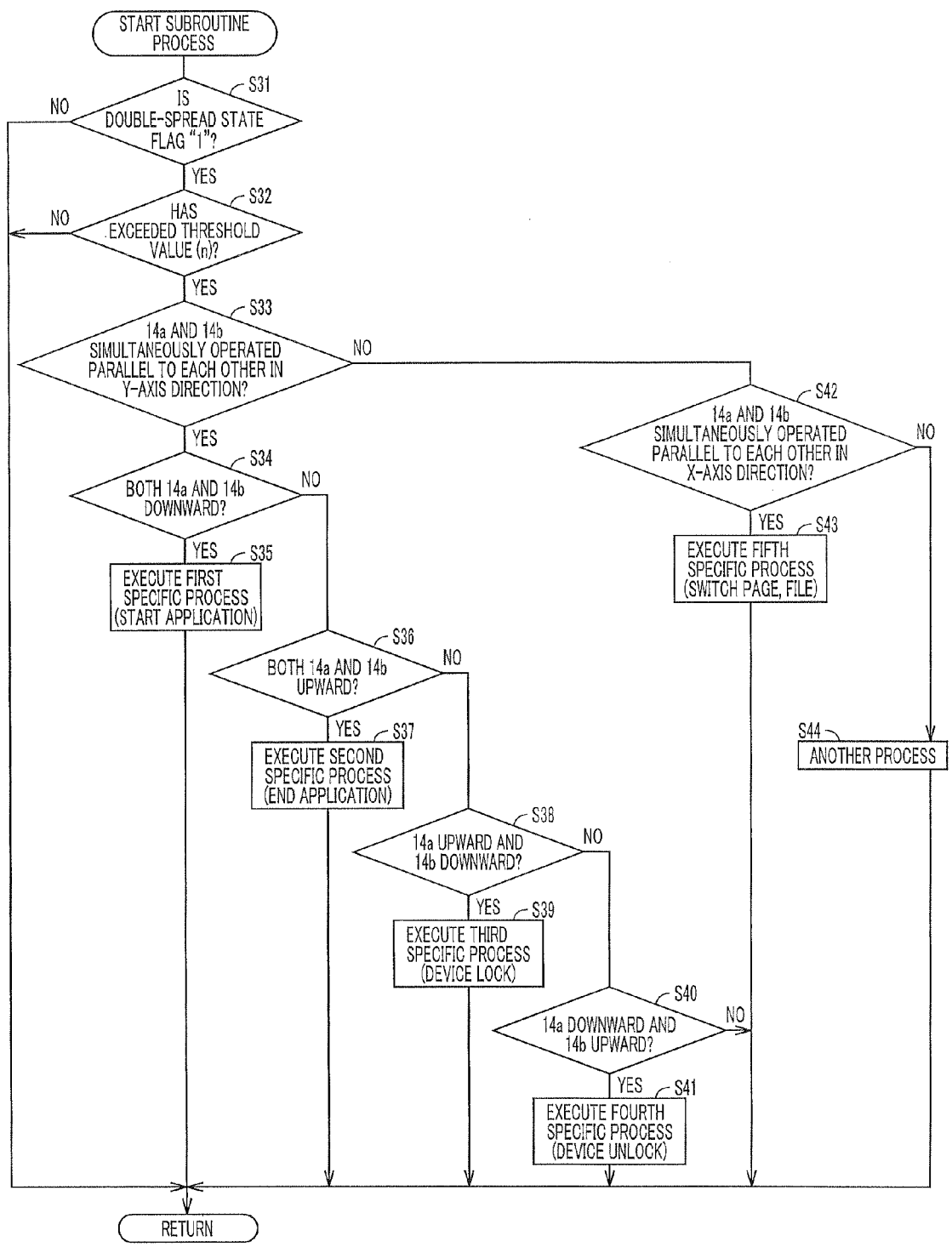
FIG. 5 is a flowchart illustrating a subroutine of the information processor of the non-limiting example embodiment.

Referring to FIG. 5, after it is determined in step S31 that the double-spread state flag is "1," it is determined in step S32 if one finger on the touch panel 14a has been moved by an amount larger than the threshold value (n), and the other finger on the touch panel 14b has been moved by an amount larger than the threshold value (n). This process is a process of comparing the current coordinate data (Xa1, Ya1) on the touch panel 14a stored in the registers R1, R2 with the touch-on coordinate data (Xa2, Ya2) stored in the registers R5, R6 to obtain the amount of movement of the one finger (Xa1−Xa2, Ya1−Ya2), and at the same time comparing the current coordinate data (Xb1, Yb1) on the touch panel 14b stored in the registers R3, R4 with the touch-on coordinate data (Xb2, Yb2) stored in the registers R7, R8 to obtain the amount of movement of the one finger (Xb1−Xb2, Yb1−Yb2). It is then determined if the amount of movement on each touch panel 14a, 14b has exceeded the threshold value (n). At this time, the moving direction of each finger on each touch panel 14a, 14b is obtained based on the direction (the direction of a vector) from the coordinate position at the start of the touch-on (a first time) to the coordinate position at the time the amount of movement has exceeded the threshold value (n) (a second time). Information on the moving direction of each finger on each touch panel 14a, 14b is used in the process of steps S33, S34, S36, S38, S40, S42.

Whether the amount of movement of each finger on each touch panel 14a, 14b has exceeded the threshold value (n) or not is detected in order to regard the touch panels 14a, 14b as having been erroneously simultaneously operated (erroneous operation), when the amount of movement on each touch panel 14a, 14b is less than the threshold value (a predetermined length), and thus to reliably detect that the user has consciously made a special gesture.

It is determined in step S33 if both fingers on the touch panels 14a, 14b have been substantially simultaneously moved substantially parallel to each other in the Y-axis (vertical in FIG. 1) direction. If it is determined in step S33 that both fingers are moved parallel to each other in the Y-axis direction, it is judged (or determined) in step S34 that the operation performed by the user is the operation of moving both fingers downward. In step S35, e.g., a command to "start an application" is executed as a first specific process defined for the operation shown in FIG. 3A. Then, the program returns to the main routine.

In the above description, the command to "start an application" is described in connection with the process of the second mode. However, in common usage, the common to "start an application" is executed before the process of the first mode.

As shown in FIG. 3B, if the user moves the two fingers upward of the touch-on start position by an amount larger than the threshold value (n), it is determined in step S34 via steps S31 to S33 that the operation performed by the user is not the operation of moving both fingers downward. Then, the program proceeds to step S36. It is determined in step S36 that the operation performed by the user is the operation of moving both fingers upward. In step S37, e.g., a command to "end an application" is executed as a second specific process defined for the operation shown in FIG. 3B. Then, the program returns to the main routine.

As shown in FIG. 3C, if the user moves one of the two fingers upward and the other finger downward each by an amount larger than the threshold value (n), it is determined in step S36 via steps S31 to S34 that the operation performed by the user is not the operation of moving both fingers upward. It is determined in step S38 that the operation performed by the user is the operation of moving one of the fingers upward and the other finger downward. In step S39, e.g., a command to "lock the device" is executed as a third specific process defined for the operation shown in FIG. 3B. Then, the program returns to the main routine.

As shown in FIG. 3D, if the user moves one of the two fingers downward and the other finger upward each by an amount larger than the threshold value (n), it is determined in step S38 via steps S31 to S34, S36 that the operation performed by the user is not the operation of moving one of the fingers upward and the other finger downward. It is determined in step S40 that the operation performed by the user is the operation of moving one of the fingers downward and the other finger upward. In step S41, e.g., a command to "unlock the device" is executed as a fourth specific process. Then, the program returns to the main routine.

In the gestures of FIGS. 3C and 3D, the movement traces of the two fingers have an arc shape, and thus to be exact, are not parallel to each other. However, a certain degree of latitude is allowed in making a determination in step S33.

As other examples of the gestures made with two fingers shown in FIGS. 3A to 3D, the user can make a V-shape with the index finger and the middle finger, and move the two fingers toward each other (reduce the distance between the two fingers) or move the two fingers away from each other (increase the distance between the two fingers). In this case, the following process is performed. It is determined in step S33 that the operation performed by the user is not the operation of moving the fingers parallel to each other in the Y-axis direction on the touch panels 14a, 14b. It is determined in step S42 that the operation performed by the user is the operation of moving the fingers parallel to each other in the X-axis (lateral) direction on the touch panels 14a, 14b. In step S43, e.g., a command to "perform a process such as switching the page, file" is executed as a fifth specific process. Then, the program returns to the main routine to perform a process of the main routine.

If it is determined in step S42 that the operation performed by the user is not the operation of moving the fingers parallel to each other in the X-axis direction on the touch panels 14a, 14b, other process is performed in step S44, and then the program returns to the main routine. If it is determined in step S31 that the touch panels 14a, 14b are not in the double-spread state, or if it is determined in step S32 that the amount of movement of each finger is not larger than the threshold value (n), the program returns to the main routine. If it is determined in step S40 that the operation performed by the user is not the operation of moving one finger downward on the touch panel 14a and the other finger upward on the touch panel 14b, the program returns to the main routine.

If it is determined in step S11 that the operation of turning off the power switch (e.g., press and hold) has been performed, the power is turned off in step S28, and the series of operations are terminated.

As described above, in the first example embodiment, the functions are defined according to the combination of the directions in which the fingers are moved on the two touch panels 14a, 14b. Thus, the first example embodiment is advantageous in that various gestures can be detected, and the number of types of specific process can be increased.

As another example of the conditions for detecting a special operation, it may be detected that after a simultaneous touch-on of two fingers, only one of the fingers has been moved by an amount larger than the threshold value (n). In this case, as the process of step S32, it is detected that the amount of movement of the finger on one of the touch panels 14a, 14b is larger than the threshold value (n).

Second Example Embodiment

Referring to FIG. 6, the information processor 10 is configured so as to be foldable outward so that the housings 11a, 11b face outward (i.e., so as to be rotatable by 360 degrees from the closed state). This configuration allows an input operation to be performed on both sides. In the folded state, the display portion 13a and the touch panel 14a are placed on the front surface (the front side), and the display portion 13b and the touch panel 14b are placed on the back surface (the back side). Since the touch panels 14a, 14b are placed close to each other on the front and back sides, the touch panels 14a, 14b can be substantially simultaneously operated with, e.g., the thumb and the index finger. The touch panels 14a, 14b are placed so as to at least partially overlap each other as viewed in a direction perpendicular to the surfaces of the touch panels 14a, 14b.

In this case, regarding the parts that are mounted on the housing 11b on the back side, the display portion 13b may be omitted, and a touch pad may be mounted instead of the touch panel 14b. That is, if the display portion 13a and the touch panel 14a are mounted on one housing 11a, only a touch pad may be mounted on the other housing 11b. The fold detection portion 25 can detect a folded state in which both the housings 11a, 11b face outward.

The coordinates on the touch panel 14a are selected as follows. The X-axis extends in the lateral direction, the Y-axis extends in the vertical direction, and the origin (Xa=0, Ya=0) is located at the lower left corner. A value on the X-axis increases in the rightward direction, and a value on the Y-axis increases in the upward direction. The touch panel 14b is similar to the touch panel 14a in that the X-axis extends in the lateral direction, the Y-axis extends in the vertical direction, and a value on the Y-axis increases in the upward direction.

In order to simplify processing, the origin (Xb=0, Yb=0) on the touch panel 14b is selected at a position similar to the coordinate position of the origin of the touch panel 14a as viewed from the surface of the touch panel 14a (vertical surface of the touch panel 14a). Thus, the origin (Xb=0, Yb=0) is located at the lower right corner as viewed from the back side, and a value on the X-axis increases in the leftward direction. That is, the coordinate positions in the X-axis direction on the touch panels 14a, 14b are located symmetrically with respect to the central axis along which the information processor 10 is folded.

As a modification of the second example embodiment, the information processor 10 may be formed by a single housing main body, the display portion 13a and the touch panel 14a may be mounted on one principal surface of the housing main body, and a touch pad may be mounted on the other principal surface of the housing main body. In this case, the fold detection portion 25 is not necessary.

In the case where the information processor 10 is formed by a single housing main body, the housing main body may have a large thickness, and a touch pad may be mounted on a side surface thereof. The touch panel 14a may be mounted on the front surface, and the touch pad may be mounted on three surfaces, namely the back surface and two side surfaces.

The information processor 10 configured as described above is suitable for applications of mobile phones, electronic books, etc.

Figure 7A:
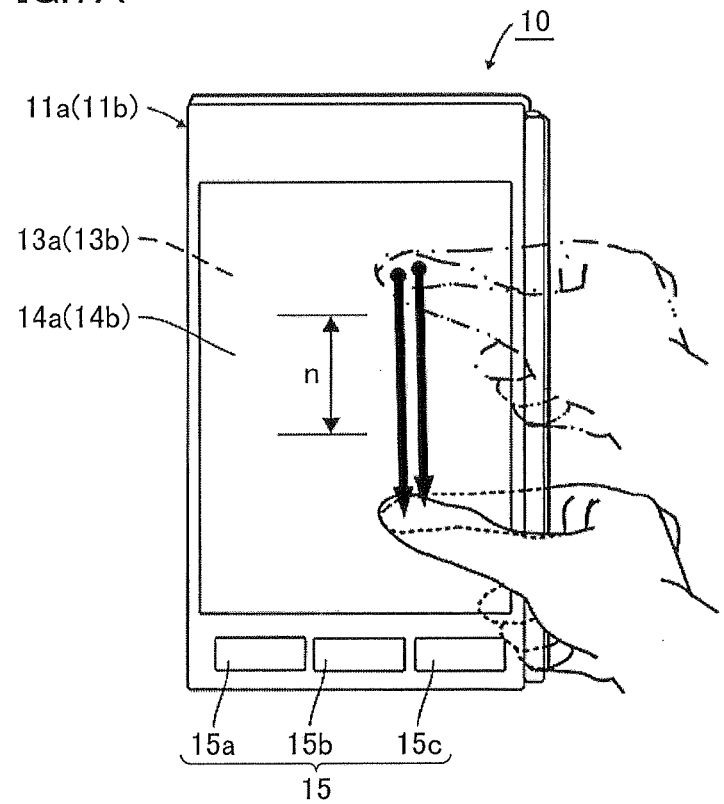
FIGS. 7A to 7F show operation (gesture) examples of another non-limiting example embodiment.
Figure 7B:
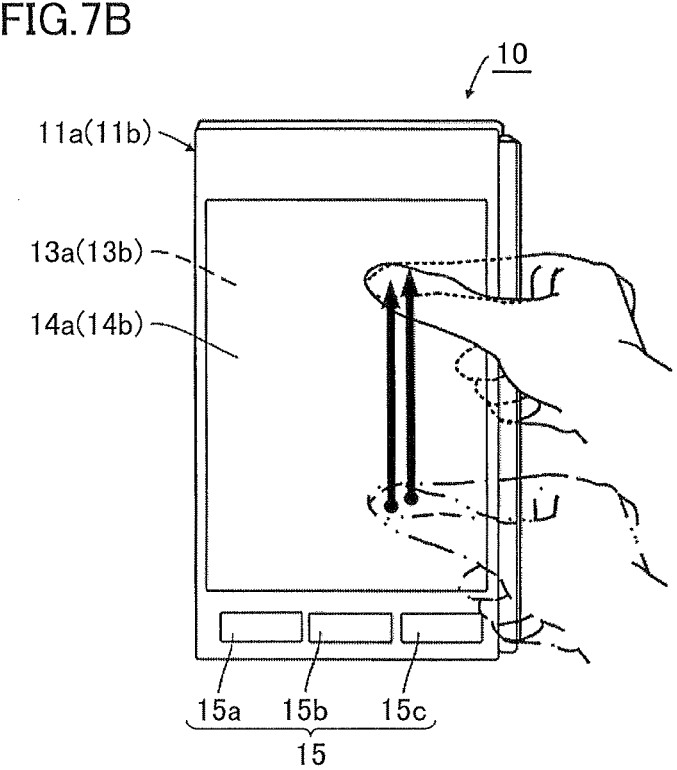

Gestures shown in FIGS. 7A to 7D are gesture operation examples using the information processor 10 configured as in the second example embodiment. Specifically, FIG. 7A corresponds to FIG. 3A, and a command is entered by moving two fingers (thumb and index finger) downward (in the vertical or Y-axis direction). FIG. 7B corresponds to FIG. 3B, and a command is entered by moving two fingers upward. That is, in FIGS. 7A and 7B, the user slides two fingers in the same direction.

Figure 7C:
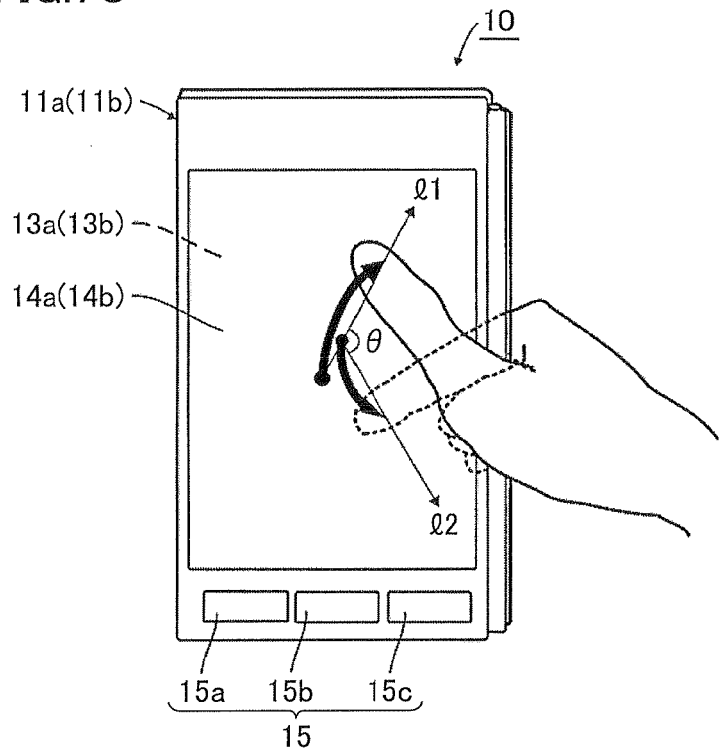
Figure 7D:
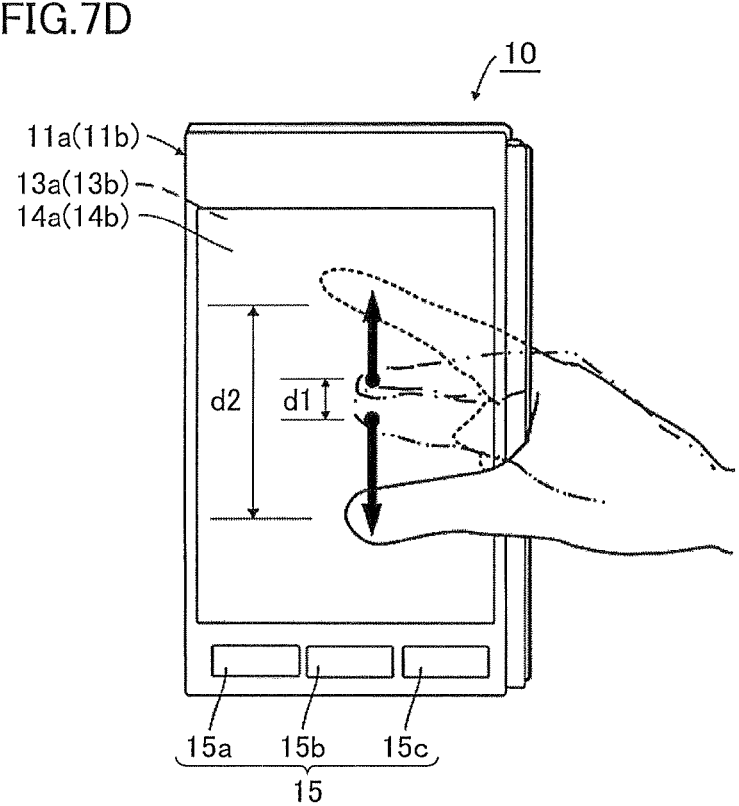

FIG. 7C corresponds to FIG. 3C, and a command is entered by moving one finger (thumb) upward and the other finger (index or middle finger) downward. FIG. 7D corresponds to FIG. 3D, and a command is entered by moving one finger (thumb) downward and the other finger (index or middle finger) upward. That is, in FIGS. 7C and 7D, the user slides two fingers in the opposite directions by moving the fingers as if he/she snaps the fingers.

Figure 7E:
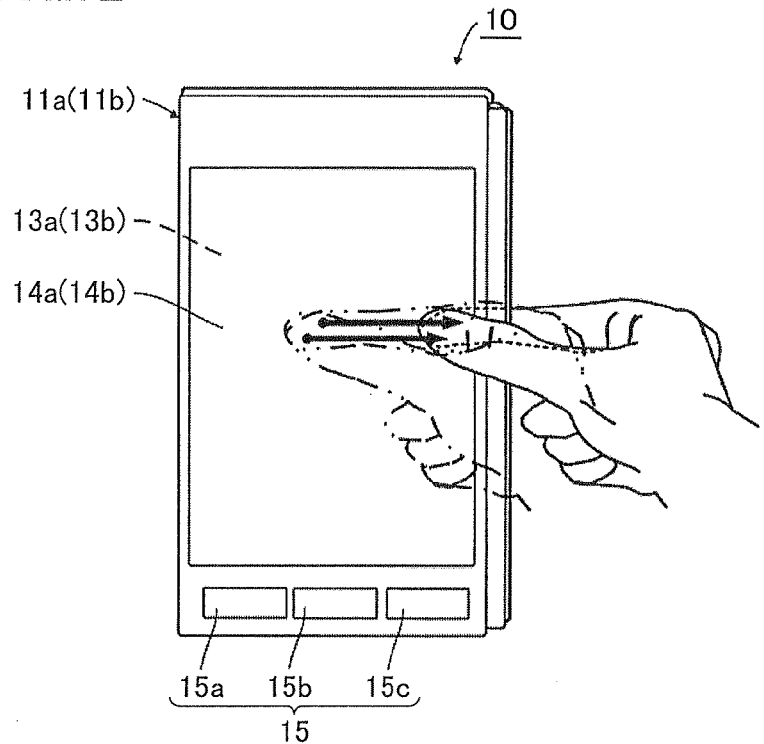
Figure 7F:
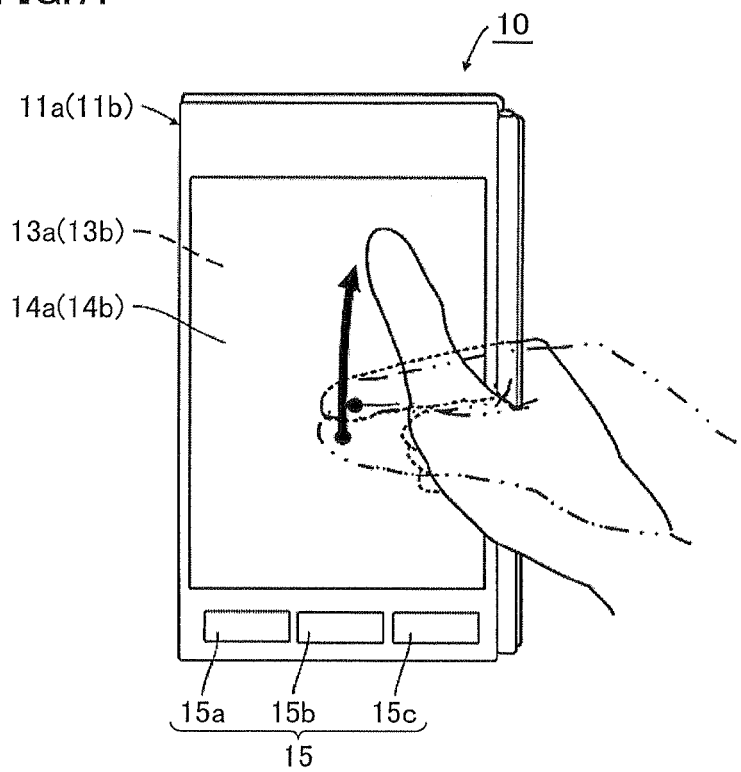

In FIG. 7E, a command is entered by moving two fingers (thumb and index finger) in the lateral direction (the X-axis direction) of the housing main body 11. In FIG. 7F, a command is entered by moving (sliding) only one finger (thumb) with the other finger (index finger) being substantially fixed.

The gestures shown in FIGS. 7A to 7F may be effective when made in a specific region as viewed in a direction perpendicular to the touch surfaces of the touch panels 14a, 14b. For example, if two fingers are slid in the opposite directions in FIGS. 7C and 7D, the gesture may be effective only if both fingers are slid in the specific region, and the gesture may be ineffective if one of the fingers is slid in a region outside the specific region.

Figure 4:
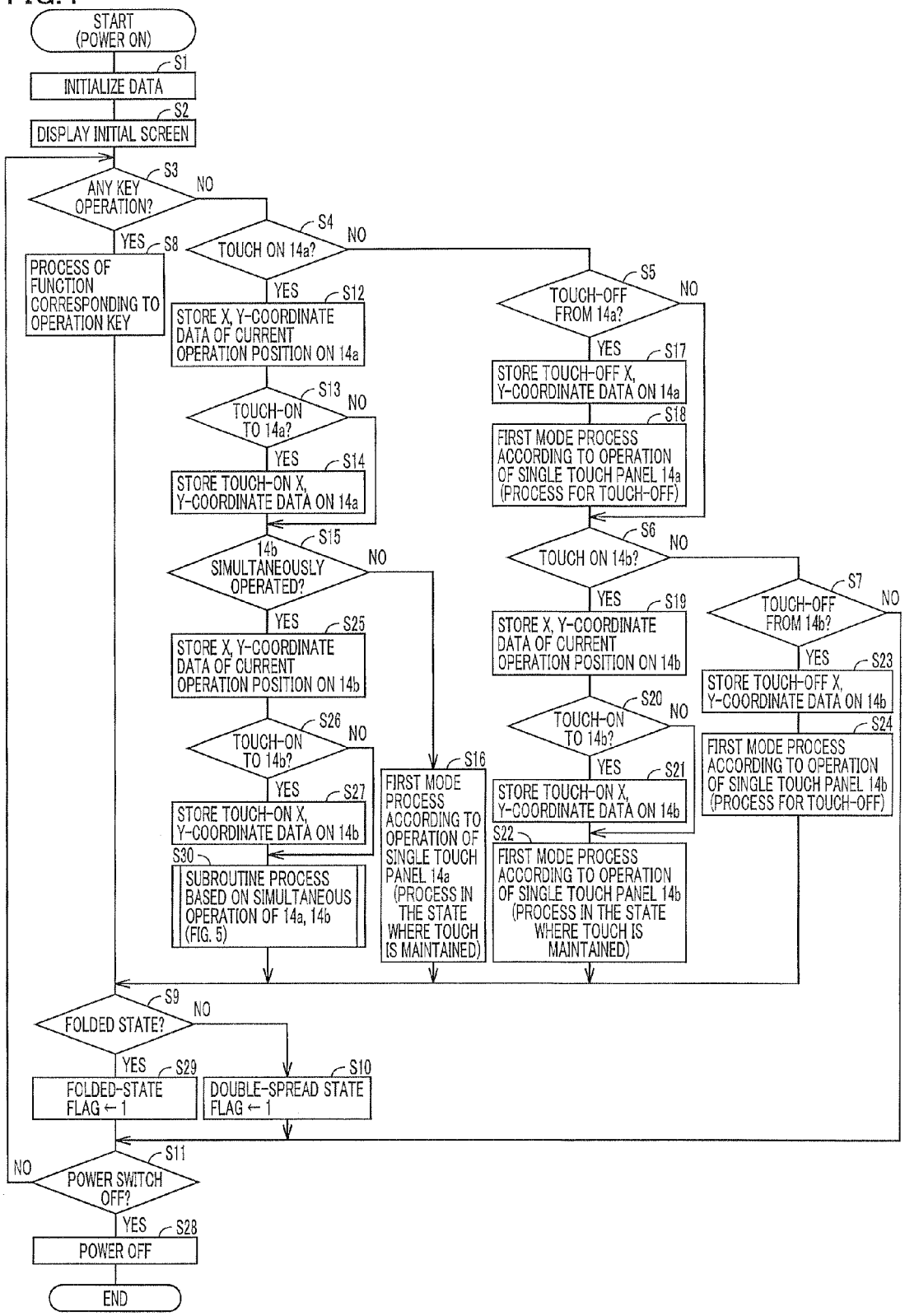
FIG. 4 is a flowchart illustrating a main routine of the information processor of the non-limiting example embodiment.

The information processor 10 is configured as shown in the block diagram of FIG. 2, and the flowchart of the information processor 10 is substantially similar to that of FIGS. 4 and 5 except for a partially change. In the following description, since the first mode (the normal mode) is common to the first and second example embodiments, description thereof will be omitted, and an operation associated with the gesture operation examples of FIGS. 7A to 7F in the second mode (the special mode), and an operation of a part changed in order to process the gesture inputs of FIGS. 7A to 7F will be described in detail below.

Prior to the gesture input operations of FIGS. 7A to 7F, the housing 11b is rotated about a support shaft by about 360 degrees with respect to the housing 11a, so that the display portion 13a and the touch panel 14a form the front surface (the front side) and the surface of the housing 11b which have the touch panel 14b mounted thereon forms the back surface (the back side). If the power switch is turned on in this state, it is determined in step S9 via steps S1, S2, S3, S8 of FIG. 4 (the main routine) that the information processor 10 is in the outward folded state. After "1" is written to the folded-state flag in step S29, the program returns to step S3 via step S11, and waits for an input in steps S3 to S7. At this time, if "1" has been written to the double-spread state flag, "0" is written to the double-spread state flag.

If the user wishes to enter a command to execute the first specific process (e.g., start an application) while the program is waiting for an input, the user makes a C-shape (or U-shape) with two fingers (e.g., thumb and index finger) of one hand, touches the touch panel 14a with one finger (thumb) and the touch panel 14b (or the touch pad) with the other finger (index finger), and slides the two fingers downward by an amount larger than the threshold value (n) while holding the information processor between the two fingers, as shown in FIG. 7A.

In response to this input, the subroutine process (FIG. 5) based on substantially simultaneous operation of the touch panels 14a, 14b is performed in step S30 via steps S4, S12 to S15, S25 to S27 in FIG. 4. That is, in step S31 of FIG. 5, it is determined "if the folded-state flag is '1'" in the second example embodiment, instead of "if the double-spread state flag is '1'" in the first example embodiment. If it is determined that the folded-state flag is "1," it is determined in step S32 if the amount of movement has exceeded the threshold value (n). If the amount of movement has not exceeded the threshold value (n), the program returns to the main routine, and repeats steps S3, S4, S12 to S15, S25 to S27, S30 (S31, S32) until the amount of movement exceeds the threshold value (n).

If it is determined that the amount of movement has exceeded the threshold value (n), it is determined in step S33 if both fingers on the touch panels 14a, 14b have been substantially simultaneously moved parallel to each other in the Y-axis direction. If the parallel movement in the Y-axis direction is detected, it is determined in step S34 that both of the operation directions on the touch panels 14a, 14b are downward. Then, the first specific process (e.g., "start an application") is executed in step S35.

Since the processes corresponding to these steps are described in detail in the corresponding steps of the first example embodiment, description thereof will be omitted.

If the user wishes to enter a command to execute the second specific process (e.g., "end an application"), the user performs an upward slide operation in the same direction by sliding the two fingers upward (the direction opposite to FIG. 7A) by an amount larger than the threshold value (n), as shown in FIG. 7B.

In response to this input, the subroutine process based on substantially simultaneous operation of the touch panels 14a, 14b is performed in step S30 via steps S4, S12 to S15, S25 to S27 in FIG. 4.

Specifically, it is determined in step S31 if the folded-state flag is "1." It is determined in step S32 that the amount of movement has exceeded the threshold value (n). It is determined in step S33 that the operation performed by the user is parallel movement in the Y-axis direction. It is determined in step S34 that neither of the operation directions on the touch panels 14a, 14b is downward. It is determined in step S36 that both of the operation directions on the touch panels 14a, 14b are upward. Then, the second specific process (e.g., "end an application") is executed in step S35.

If the user wishes to enter a command to execute the third specific process (e.g., "lock the device" as an example of limiting the operation of the information processor 10), the user performs a slide operation in the opposite directions by sliding one finger (thumb) upward and the other finger (index finger) downward each by an amount larger than the threshold value (n), as shown in FIG. 7C.

In response to this input, it is determined in step S38 via steps S4, S12 to S15, S25 to S27 in FIG. 4 and steps S31 to S34, S36 in FIG. 5 that the operation direction on the touch panel 14a is upward and the operation direction on the touch panel 14b is downward (the slide operation in the opposite directions). Then, the third specific process (e.g., "lock the device") is executed in step S39.

If the user wishes to enter a command to execute the fourth specific process (e.g., "unlock the device" as an example of canceling the limitation of the operation of the information processor 10), the user performs a slide operation in the opposite directions by sliding one finger (thumb) downward and the other finger (index finger) upward each by an amount larger than the threshold value (n), as shown in FIG. 7D.

In response to this input, it is determined in step S40 via steps S4, S12 to S15, S25 to S27 in FIG. 4 and steps S31 to S34, S36, S38 that the operation direction on the touch panel 14a is downward and the operation direction on the touch panel 14b is upward (the slide operation in the opposite directions). Then, the fourth specific process (e.g., "unlock the device") is executed in step S41.

If the user wishes to enter a command to execute the fifth specific process (e.g., "switch the page, file, etc." as an example of switching a display object displayed on the information processor 10), the user slides one (thumb) on the touch panel 14a and the other finger (index finger) on the touch panel 14b parallel to each other in the X-axis (lateral) direction by an amount larger than the threshold value (n) while holding the information processor 10 between the fingers, as shown in FIG. 7E.

In response to this input, it is determined in step S42 via steps S4, S12 to S15, S25 to S27 in FIG. 4 and steps S31 to S33 that the operation directions on the touch panels 14a, 14b are parallel to each other in the Y-axis direction. Then, the fifth specific process (e.g., "switch the page or file") is executed in step S43.

Thereafter or after steps S35, S37, S39, S41, the program returns to the main routine. If it is determined in step S42 that the operation directions on the touch panels 14a, 14b are not the X-axis direction, another process is performed in step S44, and then the program returns to the main routine.

Third Example Embodiment

The processes of detecting and determining the gesture input operations shown in FIGS. 7A to 7D, 7F can be performed by a processing method other than the flowcharts of FIGS. 4 and 5.

The operation in this processing method (e.g., it is determined by using a difference calculation unit if the operation performed by the user is a slide operation in the same direction or a slide operation in the opposite directions) will be described with reference to the flowchart of FIG. 8. Accordingly, the computer functions as the differential calculation unit.

The third example embodiment will be described with respect to an example in which the third example embodiment has a configuration similar to the second example embodiment. The portions common to or corresponding to the flowcharts of FIGS. 4 and 5 will be briefly described, and the corresponding step numbers of the first example embodiment will be shown in parentheses in the following description.

In step S51, the storage regions 22a to 22d are initialized (a process similar to S1; the same applies to the following step numbers in parentheses). The initial screen is displayed in step S52 (S2).

It is determined in step S53 if there is a touch on the touch panel 14a. If it is determined that there is a touch on the touch panel 14a, coordinates of the current touch position on the touch panel 14a are stored in the registers R1, R2 in step S54 (S12). In step S55, if the touch on the touch panel 14a is the start of a touch-on, touch-on coordinates are stored in the registers R5, R6 (S13, S14). In step S56, if the touch is lifted from the touch panel 14a, touch-off coordinates are stored in the registers R9, R10 in step S56 (S5, S17). The amount of movement (or the distance) of the operation on the touch panel 14a is calculated in step S57. This amount of movement is calculated by obtaining the difference (the distance) between the touch-on coordinates and the coordinates of the current touch position (or the touch-off coordinates) on the touch panel 14a.

If it is determined in step S53 that there is no touch on the touch panel 14a, the program proceeds to step S58 described below.

It is determined in step S58 that there is a touch on the touch panel 14b. If it is determined that there is a touch on the touch panel 14b, coordinates of the current touch (or operation) position on the touch panel 14b are stored in the registers R3, R4 in step S59 (S6, S19). In step S60, if the touch on the touch panel 14b is the start of a touch-on, touch-on coordinates are stored in the registers R7, R8 (S20, S21). In step S61, if the touch is lifted from the touch panel 14b, touch-off coordinates are stored in the registers R11, R12 (S7, S23). The amount of movement of the operation on the touch panel 14b is calculated in step S62. This amount of movement is calculated by obtaining an absolute value of the difference between the touch-on coordinates and the coordinates of the current touch position (or the touch-off coordinates) on the touch panel 14b.

If it is determined in step S58 that there is no touch on the touch panel 14b, the program proceeds to step S81 described below.

It is determined in step S63 if the amount of movement on one of the touch panels 14a, 14b has exceeded the threshold value (n). The program waits in step S63 until the amount of movement larger than the threshold value (n) is detected. If the amount of movement on one of the ouch panels 14a, 14b has exceeded the threshold value (n), a difference calculation process, namely a process of determining if the operation performed on the touch panels 14a, 14b is the slide operation in the same direction or the slide operation in the opposite directions, is performed in steps S64 to S66, S73. The program may return to step S53 if the amount of movement does not exceed the threshold value (n) even after a wait for a certain period of time in step S63.

Specifically, at the time the amount of movement on at least one of the touch panels 14a, 14b has exceeded the threshold value (n) (the second time), the difference (d2−d1) between the distance (d2) between the current positions on the touch panels 14a, 14b at the second time and the distance (d1) between the positions on the touch panels 14a, 14b at the start of the touch-on (the first time) is calculated in step S64. It is determined in step S65 if the absolute value of the difference (d2−d1) has exceeded a predetermined value (m). If the absolute value of the difference (d2−d1) is equal to or less than the predetermined value (m), it is determined in step S66 that the operation performed by the user is the slide operation in the same direction.

That is, if the difference does not increase from the start of the touch-on, the difference between d2 and d1 remains substantially the same, and therefore it is determined that the operation performed by the user is a slide operation in the same direction (FIG. 7A or 7B). It is determined in step S67 if the difference (a1−a2) between the Y-coordinate position (a1) at the start of the touch-on to the touch panel 14a and the Y-coordinate position (a2) at the time the amount of movement has exceeded the threshold value (n) is smaller than 0 (zero). If it is determined that the difference is equal to or larger than 0, it is determined in step S68 that the operation performed by the user is a downward slide operation on both touch panels 14a, 14b. Thus, the gesture operation shown in FIG. 7A is detected. Then, the first specific process (e.g., "start an application") is executed in step S69.

Thereafter, it is determined in step S70 if a touch-off has occurred on both touch panels 14a, 14b. If no touch-off is detected, the program returns to step S53.

If it is determined in step S67 that the difference (a1−a2) is smaller than 0, it is determined in step S71 that the operation performed by the user is an upward slide operation on both touch panels 14a, 14b. Thus, the gesture operation shown in FIG. 7B is detected. Then, the second specific process (e.g., "end an application") is executed in step S72.

It is determined in step S70 if a touch-off has occurred on both touch panels 14a, 14b. If no touch-off is detected, the program returns to step S53.

If it is determined in step S65 that the absolute value of the difference (d2−d1) is larger than the predetermined value (m), it is determined in step S73 that the operation performed by the user is a slide operation in the opposite directions (FIG. 7C or 7D). More specifically, if the difference (d2−d1) is a positive value (d1 is smaller), it is determined that the operation performed by the user is a slide operation in the opposite directions. That is, in this case, it is determined that the fingers were placed at substantially the same touch-on position on the front and back sides and have been slid away from each other in the opposite directions from as the main body is viewed from the front.

If the difference (d2−d1) is a negative value (d1 is larger), it is determined that the operation performed by the user is a slide operation in the opposite directions. That is, in this case, it is determined that the fingers were placed at the touch-on positions far from each other on the front and back sides and have been slide toward each other (or toward each other and then away from each other in the opposite directions) as the main body is viewed from the front.

It is determined in step S74 that the difference (a1−a2) between the Y-coordinate position (a1) at the start of the touch-on to the touch panel 14a and the Y-coordinate position (a2) at the time the amount of movement on the touch panel 14a has exceeded the threshold value (n) is smaller than 0, or if the difference (b1−b2) between the Y-coordinate position (b1) at the start of the touch-on to the touch panel 14b and the Y-coordinate position (b2) at the time the amount of movement on the touch panel 14b has exceeded the threshold value (n) is larger than 0. If (a1−a2) is smaller than 0 or if (b1−b2) is larger than 0, it is determined in step S75 that the operation performed by the user is an upward operation on the touch panel 14a and a downward operation on the touch panel 14b. Thus, the gesture operation shown in FIG. 7C is detected. Then, the third specific process (e.g., "lock the device") is executed in step S76.

In the following step S70, it is determined if a touch-off has occurred on both touch panels 14a, 14b. If no touch-off is detected, the program returns to step S53.

If it is determined in step S74 that the difference (a1−a2) is larger than 0 or the difference (b1−b2) is smaller than 0, it is determined in step S77 that the operation performed by the user is a downward operation on the touch panel 14a and an upward operation on the touch panel 14b. Thus, the gesture operation shown in FIG. 7D is detected. Then, the fourth specific process (e.g., "unlock the device") is executed in step S78.

In the following step S70, it is determined if a touch-off has occurred on both touch panels 14a, 14b. If no touch-off is detected, the program returns to step S53.

If the touch-off is detected on both touch panels 14a, 14b in step S70, the program waits for a certain period of time in step S79. After the certain period of time, each register in the register storage region 22a is cleared in step S80. Steps S79 and S80 are performed in order to prepare for the subsequent input by clearing each register after the certain period of time (slightly longer than the time required for steps S69, S72, S76, S78) has passed since the input operation to the touch panels 14a, 14b was eliminated.

Then, it is determined in step S81 if there is a command to end an application. If no command is detected, the program returns to step S53. If the command is detected, the series of operations is terminated.

In steps S64 to 66, S73, whether the operation performed by the user is a slide operation in the opposite directions or a slide operation in the same direction is determined by calculating the difference (d2−d1) between the distance (d2) between the positions on the touch panels 14a, 14b at the time the amount of movement on one of the touch panels 14a, 14b has exceeded the threshold value and the distance (d1) between the positions on the touch panels 14a, 14b at the start of the touch-on.

However, as shown in FIG. 7F, it may be detected that only one of the fingers (e.g., only the thumb on the front side) has been slid (or moved) by a distance larger than the threshold value with the other finger (the index or middle finger on the back side) being fixed.

As in the third example embodiment, by detecting in the difference calculation (d2−d1) process if the operation performed by the user is a slide operation in the same direction or a slide operation in the opposite directions, it can be reliably determined if the gesture input operation is the operation of FIG. 7A, 7B or the operation of FIG. 7C, 7D, even if a small value is selected as the predetermined value (m).

Figure 8:
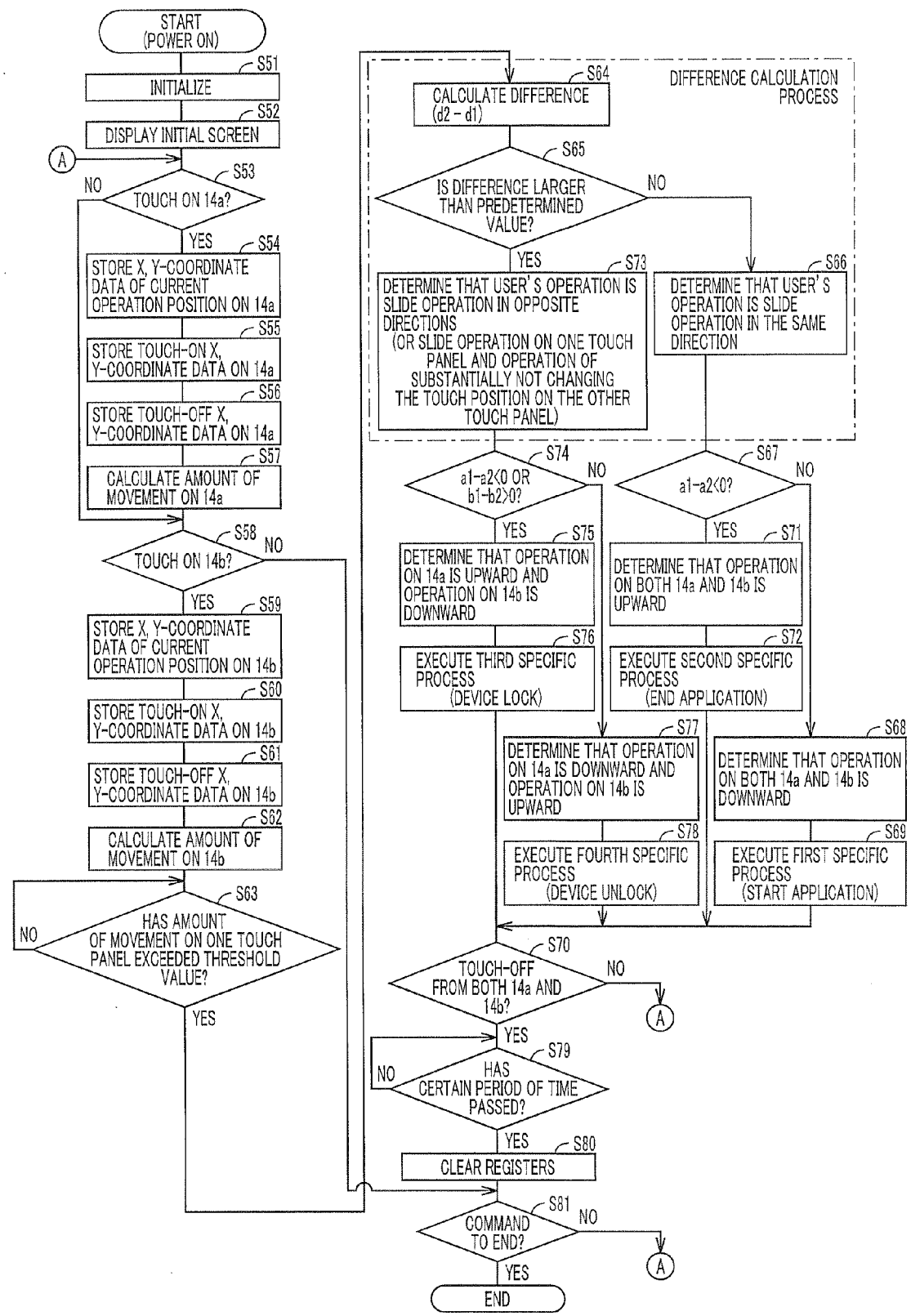
FIG. 8 is a flowchart of the another non-limiting example embodiment.
Figure 9:
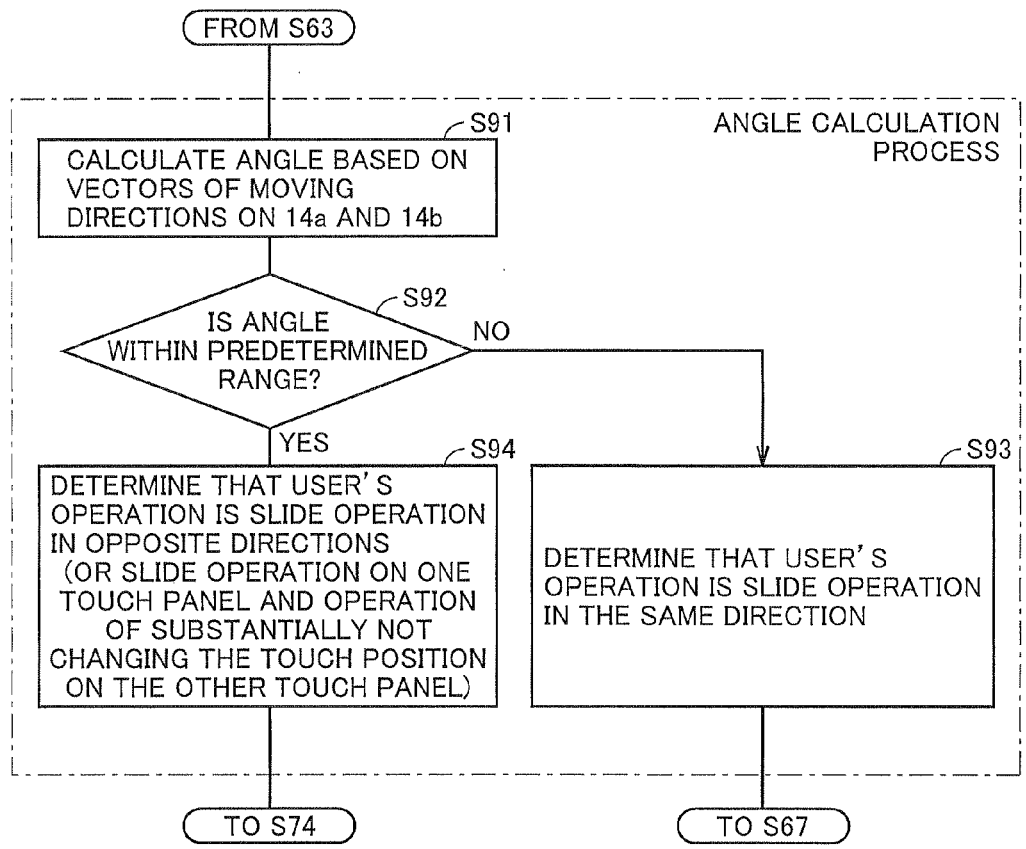
FIG. 9 is a flowchart illustrating a non-limiting modification of a process of detecting and determining a gesture input operation (an angle calculation process).

As a modification of the third example embodiment, an angle calculation process as shown in FIG. 9 may be used instead of steps S64 to S66, S73 in FIG. 8.

That is, after step S63 in FIG. 8, a process of calculating an angle between the vector of the moving direction on the touch panel 14a (l1) and the vector of the moving direction on the touch panel 14b (l2) is performed in step S91. For example, an angle θ at the intersection between the vectors l1, l2 is calculated, where "l1" represents the moving direction (vector) of a straight line connecting the touch-on starting point coordinates on the touch panel 14a and the coordinates at the time the amount of movement has exceeded the threshold value (n) on the touch panel 14a, and "l2" represents the moving direction (vector) of the straight line connecting the touch-on starting point coordinates on the touch panel 14b and the coordinates at the time the amount of movement has exceeded the threshold value (n) on the touch panel 14b.

In step S92, it is determined from the angle calculation result if the angle is within a predetermined range (e.g., θ=120 to 240 degrees). In the case of the slide operation in the same direction, the angle is substantially 0. Thus, if the angle is not within the predetermined range, it is determined in step S93 that the operation performed by the user is a slide operation in the same direction, and the program proceeds to step S67.

On the other hand, if it is determined in step S92 that the angle is within the predetermined range, it is determined in step S94 that the operation performed by the user is a slide operation in the opposite directions, and the program proceeds to step S74. Since step S67 or S74 and the subsequent processes are similar to those described with reference to FIG. 8, description thereof will be omitted.

Thus, by calculating the angle between the moving direction (l1) on the touch panel 14a and the moving direction (l2) on the touch panel 14b, it can be reliably determined that the operation performed by the user is a slide operation in the opposite directions.

The gesture operation examples of FIGS. 7A to 7F are described above with respect to an example in which the gesture input operation is performed by using the entire display region of the display portion 13a.

However, the display portion 13a may be divided into a plurality of display regions as viewed in the direction perpendicular to the display portion 13a. In this case, the step of detecting the display region that has received a gesture input may be added, and the type of gesture input operation may be determined based on the combination of the detected gesture type the detected display region.

This is advantageous in that the number of types of processes capable of defining the same gesture can be increased.

Fourth Example Embodiment

A further example embodiment will be described with reference to FIG. 10. In this example embodiment, an information processor 30 is configured so that a display portion 33a and a touch panel 34a are provided on one principal surface (the front side shown in the figure) of one housing main body 31, and a display portion 33b and a touch panel 34b are provided on the other principal surface (the back side) thereof. This information processor 30 is similar to that of FIG. 6 in that an input operation can be performed on both sides, but is different therefrom in that the information processor 30 is not foldable. It is to be understood that the display portion 33b on the back side may be omitted, and a touch pad may be used instead of the touch panel 34b.

The display screen of the display portion 33a is divided into a lower taskbar display region 35a that is long in the lateral direction, and the remaining display region 35b. The taskbar display region 35a is divided into a plurality of regions as icon display regions 351 to 354 that display icons of installed application programs. The display region 35b is a region used as a display region when executing an application program. A central portion of the display region 35b is defined as an active region 35c that allows a selected icon to be started when moved thereto.

This example embodiment is an example in which one of the icon display regions 351 to 354 displayed in the taskbar display region 35a is selected to select an application to be started. In other words, this example embodiment is a modification of the slide operation in the same direction shown in FIG. 7B, and different processes can be performed in view of touch-on coordinates and touch-off coordinates.

In order to start an application, the user touches one of the icon display regions 351 to 354 with one finger (thumb), touches the touch panel 34b on the back side with the other finger (index finger), and moves the selected icon to the active region 35c while holding the information processor 30 between the fingers.

Figure 11:
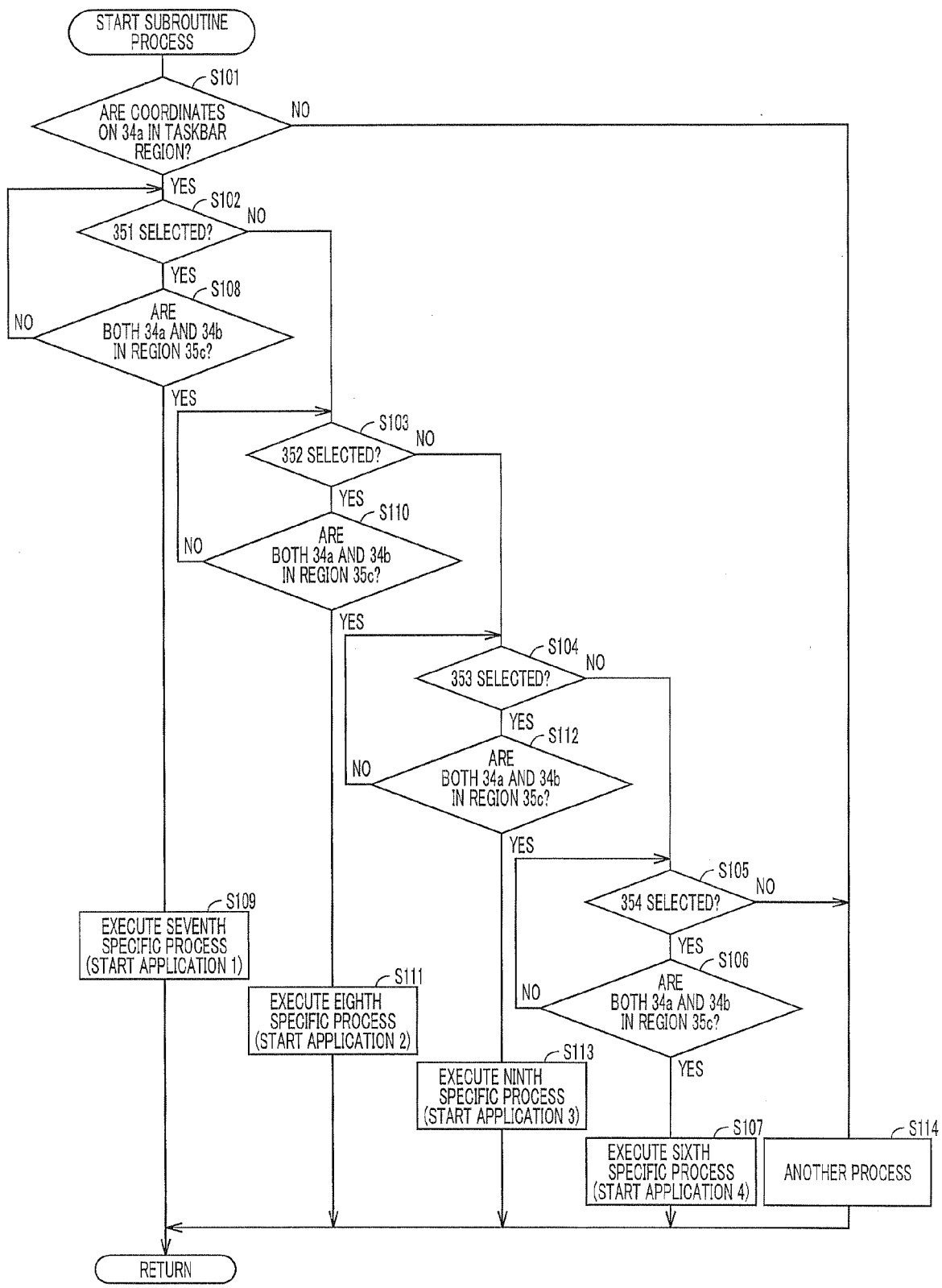
FIG. 11 is a flowchart illustrating a subroutine of the information processor of the still another non-limiting example embodiment.

The operation of this example embodiment is performed by the main routine of FIG. 4 and a subroutine of FIG. 11 instead of FIG. 5. That is, in step S2 of FIG. 4, as a process of displaying the initial screen, a taskbar is displayed on the taskbar display region 35a, and a plurality of available icons are displayed on the icon display regions 351 to 354. If only the touch panel 34a is operated as a normal operation, steps S4, S12 to S16 (steps S5, S17, S18 as necessary) are performed as the process of the first mode. If only the touch panel 34b is operated, steps S6, S19 to S22 (steps S7, S23, S24 as necessary) are performed.

In steps S4, S5, S12 to S14, S16 to S18, S30, the process on the "touch panel 14a" is executed as a process on the "touch panel 34a." In steps S6, S15, S19 to S22, S25 to S27, S30, the process on the "touch panel 14b" is executed as a process on the "touch panel 34b."

If it is determined in step S15 that the operation mode is the second mode in response to substantially simultaneous operation of the touch panels 34a, 34b, the subroutine based on the substantially simultaneous operation of the touch panels 34a, 34b is executed in step S30 according to the flow of FIG. 11 as described below.

Specifically, it is determined in step S101 if the coordinate position of the finger touching the touch panel 34a is located in the taskbar display region 35a. If one finger (thumb) of the user is touching the taskbar display region 35a, it is determined in step S102 if the icon display region 351 has been selected or not. If it is determined that the selected icon display region is not the icon display region 351, it is sequentially determined in steps S103 to S105 which of the icon display regions 352 to 354 has been selected.

Figure 10:
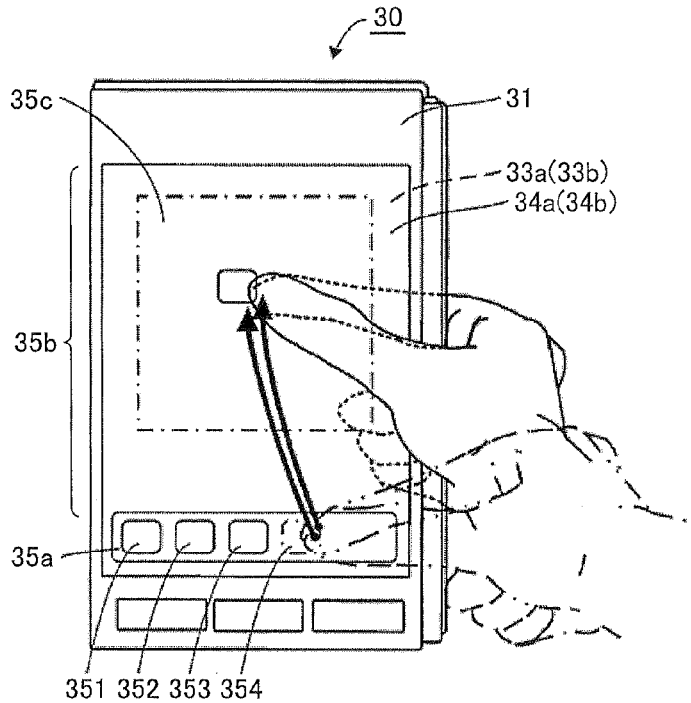
FIG. 10 shows an operation (gesture) example of an information processor of a still another non-limiting example embodiment.

For example, as shown in FIG. 10, if the user selects the icon display region 354 with the thumb and touches the touch panel 34b with the index finger, and moves the selected icon to the active region 35c by sliding the finger, steps S105, S106 are performed. That is, it is determined in step S105 that the icon corresponding to the icon display region 354 has been selected. It is determined in step S106 if the icon corresponding to the icon display region 354 has been moved to the active region 35c, and the program waits in steps S105, S106 until the icon is moved to the active region 35c. If it is detected that the icon has been moved to the active region 35c, a command to start the icon corresponding to the icon display region 354 is detected. In step S107, application 4 of the icon corresponding to the icon display region 354 is selected and the program of application 4 is started as an example of a sixth specific process.

Similarly, if the icon display region 351 is selected and the corresponding icon is moved to the active region 35c, steps S102, S108, S109 are performed, and the program of application 1 corresponding to the icon is started as an example of a seventh specific process.

If the icon display region 352 (or 353) is selected and the corresponding icon is moved to the active region 35c, steps S103, S110, s111 (or S104, S112, S113) are performed, and a program of application 2 (or 3) corresponding to the icon is started as an example of an eighth (or ninth) specific process.

If it is determined in step S101 that the coordinates on the touch panel 14a are not located in the taskbar region 35a, or if it is determined in step S105 that the icon display region 354 has not been selected, another process is performed in step S114, and then the program returns to the main routine. The application is ended by the gesture descried with reference to FIG. 7B and the process performed in response to the gesture.

As described above, in the fourth example embodiment, a plurality of applications are selected and started as the second mode. In this case, the operation on the touch panels 34a, 34b is different from the input operation (gesture) on only one of the touch panels 34a, 34b, which is an operation method for normal intended use of each application. This can reliably prevent an unintended operation of the information processor 30 even if the user performs an erroneous operation.

The fourth example embodiment is suitable for use in applications in which the information processor 30 is used as an electronic book, and the titles of a plurality of books are displayed on the icon display regions. In the case where the information processor 30 is a mobile phone, the user can read a desired book by accessing an informational website with the mobile phone, downloading electronic data (text data and image data) of the desired book, and displaying the downloaded electronic data on the display portion 33a of the mobile phone. In this case, selection of an application corresponds to selection of the title of a book, and start of the application corresponds to start of reading. Thus, the two operations, namely selection of the application and start of the application (start of reading), can be implemented by a simple input operation using a single gesture as shown in FIG. 10.

Fifth Example Embodiment

As shown in FIG. 12, the information processor 10 (or 30) may be used as an information terminal device (a controller) of an information processing system including an information processor main body 40 such as a stationary video game machine (the entire system of FIG. 12). In this case, one of the touch panels 14a, 14b (or 34a, 34b) is used to perform a normal input operation (the first mode) for a game. The input operation of the second mode is an operation of substantially simultaneously operating both touch panels 14a, 14b (or 34a, 34b) in order to enter a command of a specific function such as "start a game" or "select an electronic device connected to the video game machine."

In such an information processing system, information (coordinate data) associated with a gesture input to the touch panels 14a, 14b (or 34a, 34b) of the information terminal device 10 (or 30), etc. is transmitted from a wireless communication portion 23 to a wireless communication portion 43 of the information processor main body 40. The data received by the wireless communication portion 34 is processed by an information processing portion (a computer) 41 of the information processor main body 40. A part of the processing shown in the flowcharts of FIGS. 4, 5, 8, 9, and 11 is executed by the information processing portion 41 based on a program stored in a storage portion 42. The processing result is displayed on the screen of a display device 44 such as a television connected to the information processor main body 40.

The information processor main body 40 may be connected to the Internet line, and a command such as "connect to or disconnect the line etc." (the second mode) may be input by operating the touch panel 14a or 14b (or 34a, 34b) of the information terminal device 10 (or 30).

Sixth Example Embodiment

In the information processor 30 of the fourth example embodiment shown in FIG. 10, the display portion 33a and the touch panel 34a are mounted on one surface (the front side), and at least the touch panel 34b (or the touch pad) is mounted on the other surface (the back side). Accordingly, this information processor 30 is suitable for use in electronic book applications.

If the information processor 30 is applied to an electronic book, electronic data of each book title is prestored in the storage region 22e. In this case, the information processor 30 is used as in the following specific examples.

There are two display modes for electronic books, a normal display (reduced display) mode and an enlarged display mode. In the normal display mode, the operation of moving one finger (index finger etc.) rightward on the touch panel 34a is defined as a command to "go to the next page," and the operation of moving one finger leftward is defined as a command to "return to the previous page." These commands to "go to the next page" and "return to the previous page" are herein collectively referred to as the command to "change the page."

Figure 13A:
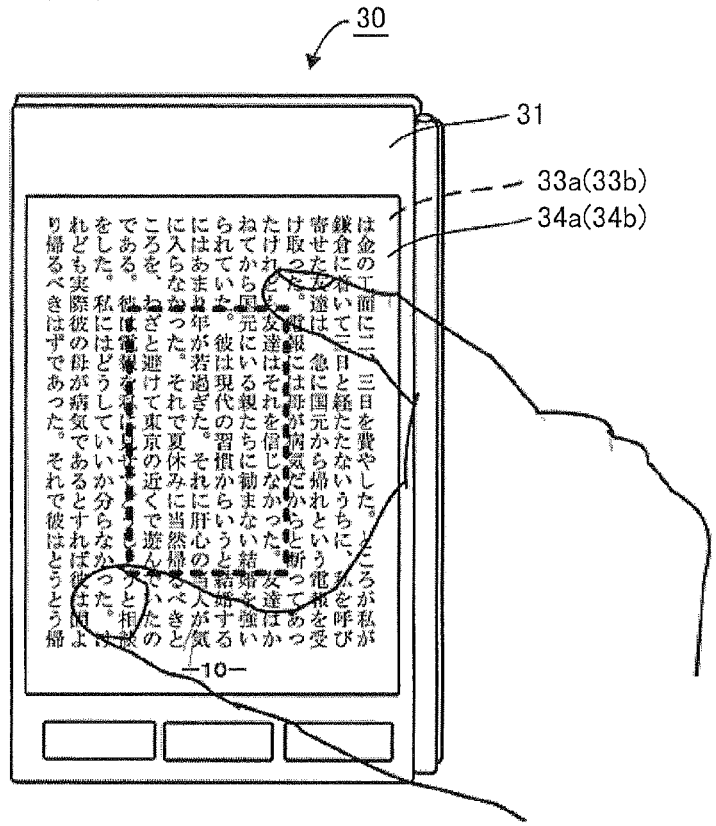
FIGS. 13A to 13F show a still further non-limiting example embodiment, and show an example of screen display in the case where the example embodiment is applied to an electronic book.
Figure 13B:
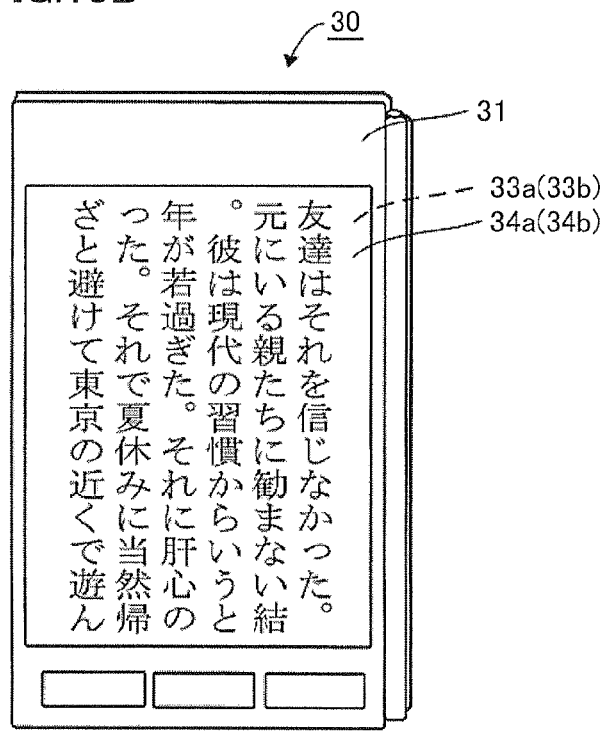

In the enlarged display mode, the user can scroll the screen (move up, down, right, and left within the display region of the entire screen) by moving one finger (index finger etc.) upward, downward, rightward, or leftward. With the text of a certain page of the electronic book being displayed in a normal character size on the display portion 33a, the user puts two fingers (thumb and index finger) together, place them on a text region to be enlarged, and move the two fingers away from each other on the touch panel 34a. In response to this operation, the text in the region around the initially touched portion, namely the region to be enlarged as shown by broken line in FIG. 13A, is enlarged and displayed on the display portion 33a as shown in FIG. 13B.

In the enlarged display mode, however, the touch panel 34a is used to enter a command to scroll the screen, and thus cannot be used to enter a command to go to the next page. Accordingly, the display mode is returned to the normal display mode before performing an operation to go to the next page. In this case, the user performs the operation to go to the next page after performing the operation to return the display mode to the "normal display mode," which complicates the operation.

Accordingly, in the sixth example embodiment, in the case where the example embodiment is applied to an electronic book, an information processing program etc. that allows the user to perform an input operation (enter a command) to go to the next page or return to the previous page (i.e., "change the page") by a simple operation without changing the display mode from the enlarged display mode.

Figure 14:
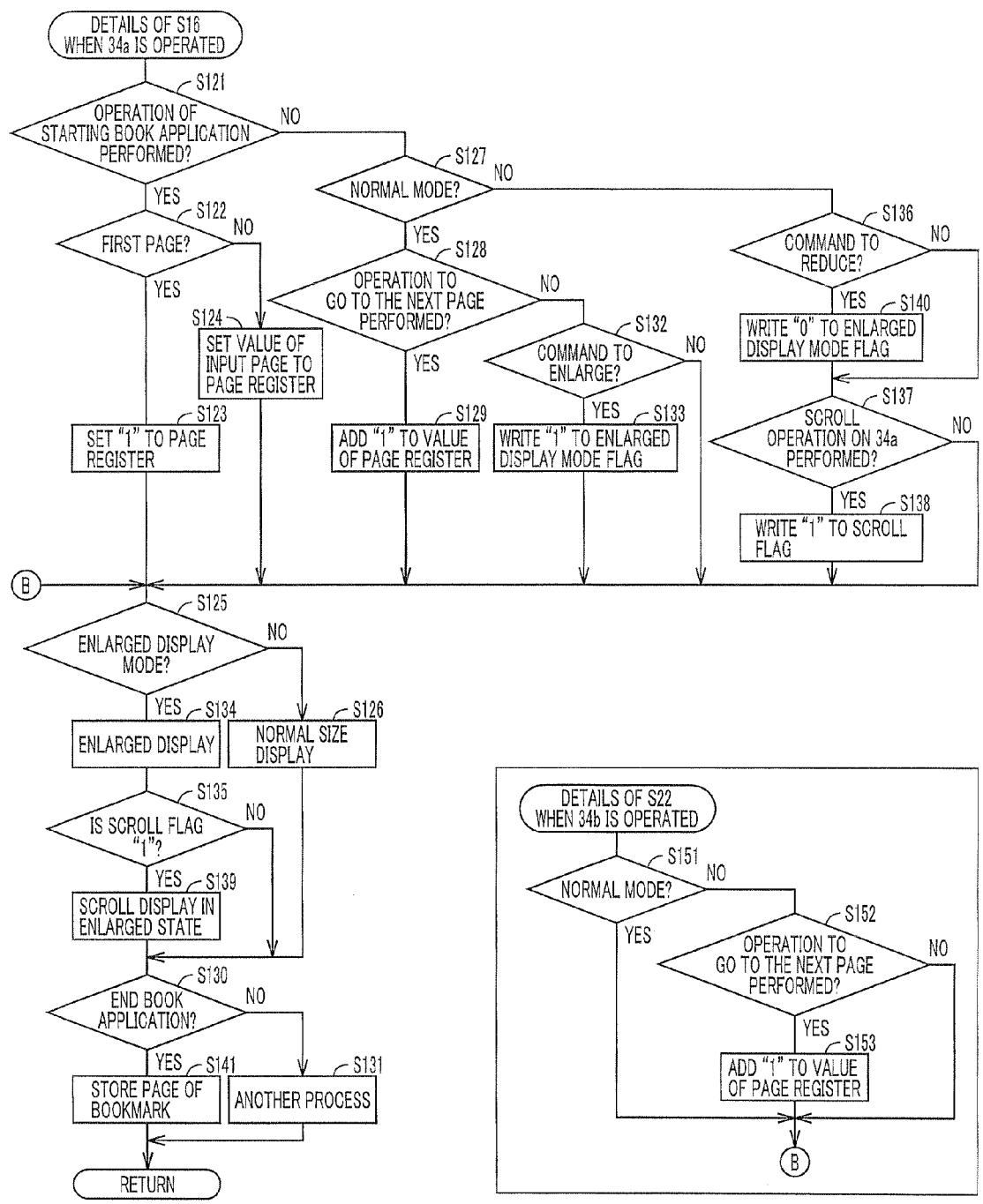
FIG. 14 is a flowchart in the case where the still further non-limiting example embodiment is applied to an electronic book.

In the case of the electronic book, details of steps S16, S22 as the process of the "first mode" shown in FIG. 4 are implemented by the flowchart of FIG. 14. Reference characters "14a," "14b" of the touch panels in the flowchart of FIG. 4 are replaced with "34a," "34b" in the case where the information processor 30 of FIG. 10 is used.

First, it is determined in step S121 if the operation of starting a book application has been performed. For example, if a command to start reading is entered by selecting a desired book title by the gesture as shown in FIG. 10, it is determined in step S121 that the command has been entered. It is determined in step S122 if reading is started from the first page (page 1). The user selects whether to read from the first page or to read from the page he/she was reading in the previous reading (the page with a bookmark described below in step S141). If the user selects to read from the first page, "1" is written to a page register (R14) included in the register region 22a in step S123. If the user selects to read from the page he/she was reading in the previous reading (or any page but the first one), the designated page number is written to the page register in step S124.

It is determined in step S125 if the display mode is the enlarged display mode. If the display mode is not the enlarged display mode (if the display mode is the normal display mode), the text (text data) of the page number stored in the page register (R14) is read from the storage region 22e, and is displayed in a normal character size on the display portion 33a in step S125 (see FIG. 13A). If the operation to go to the next page is performed on the touch panel 34a in this state, it is determined in step S127 via step S121 if the display mode is the normal display mode. If it is determined that the display mode is the normal display mode, it is determined in step S128 that the operation to go to the next page has been performed. In step S129, "1" is added to the page register, and the page number to be displayed next is stored in the page register. In response to this, text data of the next page is read in step S126 via step S125, and is displayed in a normal character size on the display portion 33a. In the following step S130, it is determined if there is a command to end the book application. After another process is performed in step S131, the process returns (to the main routine or step S121).

In response to every operation to go to the next page, steps S121, S127 to S129, S125, S126 are repeated, and the text of the next page is displayed.

Although the flowchart is not shown, in order to return to the previous page, the user moves the index finger from right to left on the touch panel 34b, and the value of the page register R14 is reduced by 1 in response to this operation.

When the user wishes to enlarge the text, the user performs a gesture input operation on the touch panel 34a to enter a command to enlarge the text. In this gesture, the user puts the thumb and the index finger together, starts a touch-on in this state, and moves the two fingers away from each other to a region to be enlarged (the range shown by broken line in FIG. 13a). This command to enlarge the text is detected in step S132 via steps S121, S127, S128. In step S133, "1" is written to an enlarged display mode flag (or a process of setting a flag is performed). In the following step S125, it is determined that the display mode is the enlarged display mode. In step S134, the text in the predetermined range located around the region where the command to enlarge the text has been input is enlarged, and the enlarged text is displayed on the display region 33a (see FIG. 13B). It is determined in step S135 that "1" has not been written to a scroll flag, and the program returns via steps S130, S131.

Figure 13C:
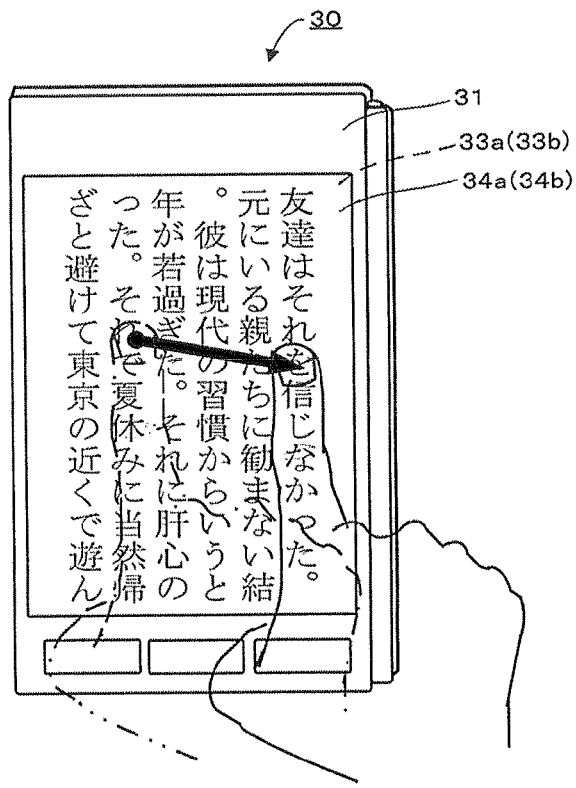
Figure 13D:
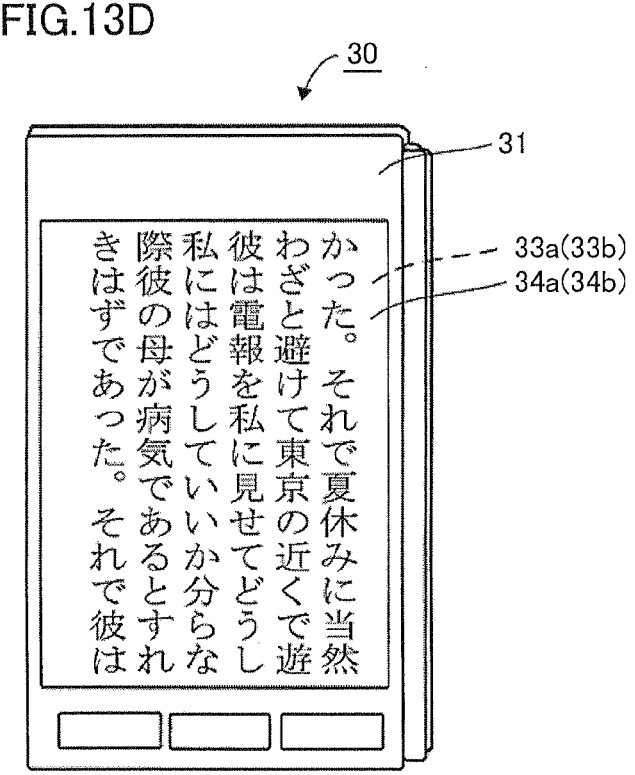

If the user has finished reading the displayed text in the enlarged display mode, the user touches the touch panel 34a with one finger as shown in FIG. 13C, and inputs the scrolling direction and range. In this case, it is determined in step S136 via steps S121, 127 that there is no command to reduce the text. It is determined in step S137 that there has been a touch on the touch panel 34a and the screen of the touch panel 34a has been scrolled. In step S138, "1" is written to the scroll flag, and the scrolling direction is written to a register (R15). Then, it is determined in step S135 via steps S125, S134 that the scroll flag is "1." In step S139, the text is scroll-displayed in the designated direction in the enlarged display state (see FIG. 13D).

Then, the program returns to the main routine via steps S130, S131.

Figure 13E:
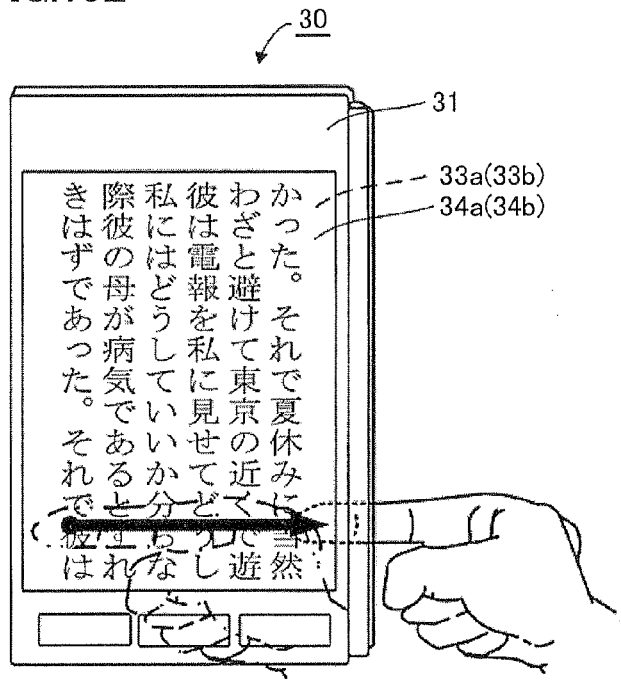

If the user has finished reading the text of that page, the user enters a command to go to the next page. Specifically, in the enlarged display state, the user touches the touch panel 34b on the back side with the index finger (or middle finger), and moves this finger rightward as viewed from the front (see FIG. 13E).

Figure 13F:
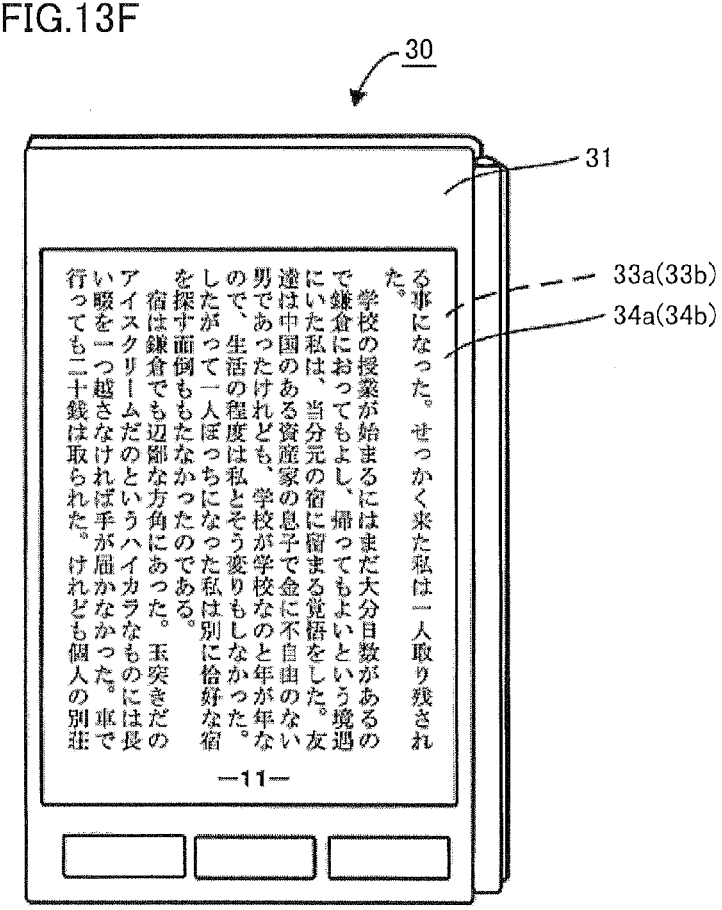

In response to this operation, it is determined in step S151 of FIG. 14 via steps S5, S19 to S22 in FIG. 4 that the display mode is not the normal display mode. It is determined in step S152 that the operation to go to the next page has been performed on the touch panel 34b. In step S153, "1" is added to the value of the page register (R14), and the page number to be displayed next is stored in the page register. Then, the program proceeds to step S125. It is determined in step S125 that the display mode is the enlarged display mode. In step S134, text data of the page number stored in the page register is read from the storage region 22e, and enlarged text is displayed on the display portion 33a (see FIG. 13F).

Then, it is determined in step S135 that the scroll flag is not "1," and the program returns to the main routine via steps S130, S131.

As described above, in the enlarged display mode, a command to go to the next page (or return to the previous page) can be entered by operating the touch panel 34b on the back side. Thus, the user does not have to switch the display mode from the enlarged display mode to the normal display mode before entering a command to go to the next page, which facilitates the operation to go to the next page.

If the touch panel 34b is erroneously operated in the normal display mode, it is determined in step S151 that the display mode is the normal display mode, and the program proceeds to step S125, and returns to the main routine via steps S126, S130, S131.

If the user wishes to switch the display mode from the enlarged display mode back to the normal display mode, the user performs an operation to reduce the display, e.g., an operation of touching the touch panel 34 with the thumb and the index finger being away from each other, and then bringing these fingers together (or moving the fingers like pinching something). Thus, it is determined in step S136 via steps S121, S127 that the operation to reduce the display has been performed. In step S140, "0" is written to an enlarged display mode flag, and preparations are made to switch the display mode to the normal display mode. It is determined in step S137 that the operation made by the user is not the operation of scrolling the screen ("0" is written to the scroll register as necessary), and the program proceeds to step S125. It is determined in step S125 that the enlarged display mode flag is not "1" (i.e., the display mode is the normal display mode). In step S126, the text is displayed in a normal character size. Then, the program returns to the main routine via steps S130, S131.

After steps S126, S135, or S139, it is determined in step S130 if a command to end the book application has been entered. If no command to end the book application is detected, another process is performed in step S139, and the program returns to the main routine.

If the user wishes to end the book application, the user performs an operation as shown in, e.g., FIG. 7B. At this time, it is determined in step S130 that a command to end the book application has been entered. In step S141, a page with a bookmark is stored. Specifically, the page number immediately before the page number stored in the page register is stored as a backup in a storage medium capable of retaining the storage state even after the power is off (a flash memory etc., not shown). The page number of the bookmark is used to set the page number in the page register (R14) in step S124 when the user resumes reading.

Although the sixth example embodiment is described with respect to the case where applications are electronic books, the present application is applicable to other applications having the normal display mode and the enlarged display mode, such as applications of viewing pictures. In that case, in normal display (several thumbnail pictures are displayed), an input operation (a lateral slide operation etc.) is performed on the touch panel on the front side to display the previous or next picture. In the case where a picture is displayed in an enlarged size, the touch panel 34a on the front side may be used to perform an operation to scroll the screen, and the touch panel 34b on the back side may be used to perform an operation to display the previous or next picture (go to the next picture or return to the previous picture).

The present application is also applicable to tabbed browsers. For example, in the case where a webpage is displayed in an enlarged size by a browser, the touch panel 34a may be used to perform an operation to scroll the screen, and the touch panel 34b may be used to display the previous or next webpage.

Although a plurality of example embodiments are described in detail above, the above description is by way of illustration in all respects, and various other modifications and variations can be made without departing from the scope of the example embodiments.

The invention claimed is:

1. A non-transitory computer-readable storage medium storing an information processing program to be executed by a computer of an information processor, wherein said information processor has a first touch surface, a second touch surface placed on a back side of said first touch surface, a first touch operation detection portion that detects a first touch operation on said first touch surface, and a second touch operation detection portion that detects a second touch operation on said second touch surface, said computer is connected to said first touch operation detection portion and said second touch operation detection portion, and said information processing program allows said computer to provide functionality comprising:

a first processing that executes a first process based on said first touch operation detected by said first touch operation detection portion, a second processing that, if said first touch operation detected by said first touch operation detection portion and said second touch operation detected by said second touch operation detection portion are slide operations in opposite directions to each other, executes a second process different from said first process based on said first touch operation detected by said first touch operation detection portion and said second touch operation detected by said second touch operation detection portion, and a mode selection that selects a first mode in which said first processing executes said first process based on said first touch operation, or a second mode in which said second processing executes said second process based on said first touch operation and said second touch operation, wherein said information processing program further allows said computer to provide functionality comprising:

a difference calculation that calculates a first distance at a first time between a first touch position corresponding to said first touch operation detected by said first touch operation detection portion and a second touch position corresponding to said second touch operation detected by said second touch operation detection portion, and a second distance between said first touch position and said second touch position at a second time later than said first time, and calculates a difference between said first distance and said second distance, and said second processing executes said second process if said difference calculated by said difference calculation satisfies a predetermined condition.

2. The non-transitory computer-readable storage medium according to claim 1, wherein said second processing executes said second process if an absolute value of said difference calculated by said difference calculation exceeds a predetermined value.

3. A non-transitory computer-readable storage medium storing an information processing program to be executed by a computer of an information processor, wherein said information processor has a first touch operation detection portion that detects a first touch operation on a first touch surface, and a second touch operation detection portion that detects a second touch operation on a second touch surface, said computer is connected to said first touch operation detection portion and said second touch operation detection portion, and said information processing program allows said computer to provide functionality comprising:

a mode switch that switches a display mode between a first display mode and a second display mode, a first processing that executes a first process based on said first touch operation detected by said first touch operation detection portion, when said display mode is said first display mode, and a second processing that executes a second process different from said first process based on said first touch operation detected by said first touch operation detection portion, and executes said first process based on at least said first touch operation detected by said first touch operation detection portion and said second touch operation detected by said second touch operation detection portion, when said display mode is said second display mode, said information program further allows said computer to provide functionality comprising:

a first display control that displays a predetermined display object on a display portion, when said display mode is said first display mode, and a second display control that displays said predetermined display object in an enlarged size on said display portion, when said display mode is said second display mode, said first processing switches said display object as said first process, and said second processing switches said display object as said first process, and scrolls a screen of said display portion as said second process.

4. An information processing system comprising:

a first touch surface, a second touch surface placed on a back side of said first touch surface, a first touch operation detection portion that detects a first touch operation on said first touch surface, a second touch operation detection portion that detects a second touch operation on said second touch surface, and a processor system including at least one processor, said processor system being coupled to said first touch operation detection portion and said second touch operation detection portion, and said processor system being configured to provide functionality comprising:

a first processing that executes a first process based on said first touch operation detected by said first touch operation detection portion, a second processing that, if said first touch operation detected by said first touch operation detection portion and said second touch operation detected by said second touch operation detection portion are slide operations in opposite directions to each other, executes a second process different from said first process based on said first touch operation detected by said first touch operation detection portion and said second touch operation detected by said second touch operation detection portion, a mode selection that selects a first mode in which said first processing executes said first process based on said first touch operation, or a second mode in which said second processing executes said second process based on said first touch operation and said second touch operation, and a difference calculation that calculates a first distance at a first time between a first touch position corresponding to said first touch operation detected by said first touch operation detection portion and a second touch position corresponding to said second touch operation detected by said second touch operation detection portion, and a second distance between said first touch position and said second touch position at a second time later than said first time, and calculates a difference between said first distance and said second distance, wherein said second processing executes said second process if said difference calculated by said difference calculation satisfies a predetermined condition.

5. The information processing system according to claim 4, wherein said second processing executes said second process if an absolute value of said difference calculated by said difference calculation exceeds a predetermined value.

6. An information processing system comprising:

a first touch operation detection portion that detects a first touch operation on a first touch surface, and a second touch operation detection portion that detects a second touch operation on a second touch surface, a processor system including at least one processor, the processor system being coupled to said first touch operation detection portion and said second touch operation detection portion, and said processor system being configured to provide functionality comprising:

a mode switch that switches a display mode between a first display mode and a second display mode, a first processing that executes a first process based on said first touch operation detected by said first touch operation detection portion, when said display mode is said first display mode, and a second processing that executes a second process different from said first process based on said first touch operation detected by said first touch operation detection portion, and executes said first process based on at least said first touch operation detected by said first touch operation detection portion and said second touch operation detected by said second touch operation detection portion, when said display mode is said second display mode, a first display control that displays a predetermined display object on a display portion, when said display mode is said first display mode, and a second display control that displays said predetermined display object in an enlarged size on said display portion, when said display mode is said second display mode, wherein said first processing switches said display object as said first process, and said second processing switches said display object as said first process, and scrolls a screen of said display portion as said second process.

7. An information processing method comprising:

detecting a first touch operation by a first touch operation detection portion on a first touch surface;

detecting a second touch operation by a second touch operation detection portion on a second touch surface placed on a back side of said first touch surface;

executing a first process based on said first touch operation detected by said first touch operation detection portion, if said first touch operation detected by said first touch operation detection portion and said second touch operation detected by said second touch operation detection portion are slide operations in opposite directions to each other, executing a second process different from said first process based on said first touch operation detected by said first touch operation detection portion and said second touch operation detected by said second touch operation detection portion, selecting a first mode in which said first process is executed based on said first touch operation, or a second mode in which said second process is executed based on said first touch operation and said second touch operation, and calculating a first distance at a first time between a first touch position corresponding to said first touch operation detected by said first touch operation detection portion and a second touch position corresponding to said second touch operation detected by said second touch operation detection portion, and a second distance between said first touch position and said second touch position at a second time later than said first time, and calculating a difference between said first distance and said second distance, wherein said second process is executed if said calculated difference satisfies a predetermined condition.

8. The information processing method according to claim 7, wherein said second process is executed if an absolute value of said calculated difference exceeds a predetermined value.

9. An information processing method comprising:

detecting a first touch operation by a first touch operation detection portion on a first touch surface, detecting a second touch operation by a second touch operation detection portion on a second touch surface, switching a display mode between a first display mode and a second display mode, executing a first process based on said first touch operation detected by said first touch operation detection portion, when said display mode is said first display mode, executing a second process different from said first process based on said first touch operation detected by said first touch operation detection portion, and executing said first process based on at least said first touch operation detected by said first touch operation detection portion and said second touch operation detected by said second touch operation detection portion, when said display mode is said second display mode, displaying a predetermined display object on a display portion, when said display mode is said first display mode, and displaying said predetermined display object in an enlarged size on said display portion, when said display mode is said second display mode, wherein said first process is switching said display object, and said second process is scrolling a screen of said display portion.

* * * * *